(12) United States Patent
Spears et al.

(10) Patent No.: US 12,033,357 B2
(45) Date of Patent: Jul. 9, 2024

(54) SYSTEM AND METHOD OF DETECTING GAS LEAKS

(71) Applicant: Sixgill, LLC, Santa Monica, CA (US)

(72) Inventors: Logan Spears, Kingston, WA (US); Carlos Anchia, Plano, TX (US); Corey Staten, Columbus, OH (US); Wei Xu, Seattle, WA (US)

(73) Assignee: Plainsight Technologies Inc., San Diego, CA (US)

( * ) Notice: Subject to any disclaimer, the term of this patent is extended or adjusted under 35 U.S.C. 154(b) by 300 days.

(21) Appl. No.: 17/457,632

(22) Filed: Dec. 3, 2021

(65) Prior Publication Data

US 2023/0177726 A1 Jun. 8, 2023

(51) Int. Cl.
*G06T 7/90* (2017.01)
*G01M 3/18* (2006.01)
(Continued)

(52) U.S. Cl.
CPC .................. *G06T 7/90* (2017.01); *G01M 3/18* (2013.01); *G06T 7/20* (2013.01); *G06V 10/25* (2022.01);
(Continued)

(58) Field of Classification Search
CPC ... G06T 7/90; G06T 7/20; G06T 2207/10024; G06T 2207/20084; G06T 2207/20212;
(Continued)

(56) References Cited

U.S. PATENT DOCUMENTS

| | | | |
|---|---|---|---|
| 5,656,813 A | 8/1997 | Moore et al. | |
| 7,385,681 B2 * | 6/2008 | Ninomiya | G01J 3/36 356/5.01 |

(Continued)

FOREIGN PATENT DOCUMENTS

| CN | 101387568 A | 3/2009 |
|---|---|---|
| CN | 111122490 A | 5/2020 |

OTHER PUBLICATIONS

International Application No. PCT/US2022/080864, International Search Report and the Written Opinion, dated May 30, 2023, 8 pages.

(Continued)

*Primary Examiner* — Tom Y Lu
(74) *Attorney, Agent, or Firm* — Ahmann Kloke LLP

(57) ABSTRACT

A method comprising receiving, from a first infrared image capture device, three images including gas equipment including a first image captured at a first time period, a second image captured at a second time period, and a third image captured at a third time period, the three images capturing an infrared spectrum, interpreting one of the three images in a red color channel of an RGB image where pixels are red-tonal in coloring, interpreting an other of the three images in a green color channel of the RGB image where pixels are green-tonal in coloring, interpreting a remaining of the three images in a blue color channel of the RGB image where pixels are blue-tonal in coloring, and providing the RGB image for display, the RGB image indicating movement as at least one color that is different from color of at least some of the gas equipment.

23 Claims, 13 Drawing Sheets

(51) Int. Cl.
  *G06T 7/20*   (2017.01)
  *G06V 10/25*  (2022.01)
  *G06V 10/56*  (2022.01)

(52) U.S. Cl.
  CPC .... *G06V 10/56* (2022.01); *G06T 2207/10024* (2013.01); *G06T 2207/20084* (2013.01); *G06T 2207/20212* (2013.01)

(58) Field of Classification Search
  CPC .......... G01M 3/18; G01M 3/002; G01M 3/38; G06V 10/25; G06V 10/56; G06V 10/26; G06V 10/454; G06V 10/62; G06V 10/764; G06V 10/82; G06V 20/52
  See application file for complete search history.

(56) References Cited

U.S. PATENT DOCUMENTS

| | | | |
|---|---|---|---|
| 9,635,285 B2* | 4/2017 | Teich | H04N 5/33 |
| 11,012,656 B2* | 5/2021 | Hirata | H04N 23/632 |
| 11,197,065 B2* | 12/2021 | Hirata | H04N 21/4316 |
| 11,386,541 B2* | 7/2022 | Al Shehri | G06N 3/044 |
| 11,467,098 B2* | 10/2022 | Kester | H04N 7/183 |
| 2005/0156111 A1 | 7/2005 | Racca et al. | |
| 2012/0314080 A1 | 12/2012 | Lee et al. | |
| 2015/0292976 A1 | 10/2015 | Xu et al. | |
| 2019/0339158 A1 | 11/2019 | Yanai et al. | |

OTHER PUBLICATIONS

Jadin et al., "Gas Leakage Detection Using Thermal Imaging Technique"; Published in: 2014 UKSim-AMSS 16th International Conference on Computer Modelling and Simulation; Date ofConference: Mar. 26-28, 2014; retrieved on [Apr. 21, 2023]; retrieved from the internet entire document.

* cited by examiner

SYSTEM AND METHOD OF DETECTING GAS LEAKS

FIELD OF THE INVENTION(S)

Embodiments of the present invention(s) relate generally systems which continuous monitoring for leaks of gases and more particularly to image capture for leak detection.

BACKGROUND

Gas leaks may be difficult to detect and when detected, may be too late. For example, some leaks may only be detected due to physical indication of a significant loss (e.g., a significant pipe breach and/or plumes of gas), a major accident (e.g., fire), and/or a significant amount of gas missing from storage. It may be appreciated that a considerable amount of gas may be lost into the atmosphere that is never detected (e.g., there are losses at one or more points in a pipeline system but the losses are not significantly large enough at any one point to trigger attention). A considerable amount of gas may be lost before detection of a major breach. Further, small gas leaks may lead to large gas leaks causing accidents, significant environmental damage, damage to infrastructure, and loss of life.

Further, to meet an increasing number of state and federal regulatory compliance requirements of the oil and gas industry, producers are seeking systems that continuously monitor and detect gas emissions and trigger alerts for leak location and severity.

Current methods of measuring or detecting gas emissions include point-source measurements, which require measurement devices to be placed at or near emission output locations such as valves and outlets. This may be a labor-intensive solution since many individual measurement devices are required and each needs separate calibration and monitoring.

SUMMARY

An example system includes at least one processor and memory. The memory may contain instructions to control any number of the at least one processor to: receive, from a first infrared image capture device with a first field of view, three images including at least some gas equipment, the three images including a first image of the at least some gas equipment captured at a first time period, a second image of the at least some gas equipment captured at a second time period, and a third image of the at least some gas equipment captured at a third time period, the first time period being before the second time period and the third time period, the second time period being before the third time period, the three images capturing an infrared spectrum, interpret one of the three images in a red color channel of an RGB image where pixels are red-tonal in coloring, interpret an other of the three images in a green color channel of the RGB image where pixels are green-tonal in coloring, interpret a remaining of the three images in a blue color channel of the RGB image where pixels are blue-tonal in coloring, and provide the RGB image for display, the RGB image indicating movement in at least one of the three images over the second time period or third time period relative to the first time period as at least one color that is different from color of at least some of the gas equipment in the three images.

In some aspects, the techniques described herein relate to a system, the instructions to control the any number of the at least one processor to further detect a change in the color of the RGB image and provide a notification regarding a possible gas leak based on an indication of the movement. In some embodiments, the instructions to control the at least one processor to further detect the change in the color of the RGB image includes the at least one processor to: generate feature maps from the RGB image by applying at least a first convolutional neural network, obtain a plurality of anchor shapes using a region proposal network by applying a first window across the feature maps, determine if each anchor shape of the plurality of anchor shapes contains an object to generate a plurality of regions of interest, extract feature maps from each region of interest, classify objects in each region of interest, predict segmentation masks on at least a subset of the plurality of regions of interest in a pixel-to-pixel manner, identify a cloud of gas within the objects based on classifications and the segmentation masks, and provide a notification of an indication of a gas leak based on an identification of the cloud of gas.

In various embodiments, each of the plurality of regions of interest being a non-rectangular, polygonal shape.

Interpret the one of the three images in the red color channel of the RGB image where pixels are red-tonal in coloring may comprise interpreting intensity of pixels that make up the one of the three images is converted from gray monochrome to concentrations that are the red-tonal. The RGB image may represent movement relative to the first image as blue-tonal pixels.

The system may further comprise instructions to stabilize at least one of the three images from an effect of a shaking of the first image capture device. The instructions to control the any number of the at least one processor to further stabilize at least one of the three images from the effect of the shaking of the first image capture device may comprise the instructions to control the any number of the at least one processor to apply a phase cross correlation to offset the second image so that a second view of the second image is substantially same as a first view of the first image.

The gas equipment may comprise at least one of a gas pipe for transporting gas or a gas storage tank. The instructions to control the any number of the at least one processor may further: receive, from a first visual spectrum image capture device with a second field of view, a color image including the at least some gas equipment, and combine the color image with the RGB image, wherein provide the RGB image for display includes provide the combined color image with the RGB image to depict pixels showing movement in red, blue, or green against contents of the color image to assist in locating a position of the movement.

In some aspects, the techniques described herein relate to a system, wherein the instructions to control the any number of the at least one processor to further identify a location of the movement relative to at least part of the at least some gas equipment by receiving identifiers relative to the at least part of the at least some gas equipment, associating at least one of the identifiers with a position of the movement, and providing the at least one of the identifiers as the location.

An example non-transitive computer readable medium may include instructions to control at least one processor to perform a method. The method may comprise receiving, from a first infrared image capture device with a first field of view, three images including at least some gas equipment, the three images including a first image of the at least some gas equipment captured at a first time period, a second image of the at least some gas equipment captured at a second time period, and a third image of the at least some gas equipment captured at a third time period, the first time period being before the second time period and the third time period, the second time period being before the third time period, the three images capturing an infrared spectrum, interpreting one of the three images in a red color channel of an RGB image where pixels are red-tonal in coloring, interpreting an other of the three images in a green color channel of the RGB image where pixels are green-tonal in coloring, interpreting a remaining of the three images in a blue color channel of the RGB image where pixels are blue-tonal in coloring, and providing the RGB image for display, the RGB image indicating movement in at least one of the three images over the second time period or third time period relative to the first time period as at least one color that is different from color of at least some of the gas equipment in the three images.

An example method may comprise receiving, from a first infrared image capture device with a first field of view, three images including at least some gas equipment, the three images including a first image of the at least some gas equipment captured at a first time period, a second image of the at least some gas equipment captured at a second time period, and a third image of the at least some gas equipment captured at a third time period, the first time period being before the second time period and the third time period, the second time period being before the third time period, the three images capturing an infrared spectrum, interpreting one of the three images in a red color channel of an RGB image where pixels are red-tonal in coloring, interpreting an other of the three images in a green color channel of the RGB image where pixels are green-tonal in coloring, interpreting a remaining of the three images in a blue color channel of the RGB image where pixels are blue-tonal in coloring, and providing the RGB image for display, the RGB image indicating movement in at least one of the three images over the second time period or third time period relative to the first time period as at least one color that is different from color of at least some of the gas equipment in the three images.

DETAILED DESCRIPTION

Various embodiments described herein include a system for continuous monitoring of gases (e.g., volatile organic compound or VOC gases). In one example, the system may utilize one or more image capture devices mounted within a gas facility. A gas facility may be or include pipeline stations, refinery facilities, and manufacturing plants.

In some embodiments, a gas monitoring system may include image capture device(s) positioned in multiple places throughout the gas facility. The image capture device(s) may be or include an infrared (IR) image capture device capable of imaging gases (e.g., gases that evaporate at room temperature). The gas monitoring system may process digital video or images from the IR image capture devices to monitor and identify leaks that may not be visible to the naked eye.

The gas monitoring system may provide images and/or indications of detected gas leaks in real-time or near real-time. Furthermore, the gas monitoring system may provide notification of a detected gas leak. The notification may include the location of the gas leak (e.g., geographic coordinates or location identifiers of the gas leak), flow rate of the gas leak, and an estimate the size of the gas leak cloud.

In some embodiments, the gas monitoring system may store images, process the images, detect gas leaks, document the process, and/or the like to assist in recreation of processes for regulatory needs, improvement of erroneous alerts, and/or improvement of the system for detecting leaks (e.g., improvement of image processing and object identification). The gas monitoring system may utilize an AI system to recognize artifacts, objects, and the like in images that indicate a leak. The gas monitoring system may store information and/or meta information regarding the AI processing, including, for example, segmentation masks or non-rectangular, polygon shapes of the gas leaks.

It may be appreciated that the gas monitoring system may be capable of continuously monitoring and detecting the emission of gases such as VOC gases, other hydrocarbons, and/or other organic compounds such as methane.

Figure 1:
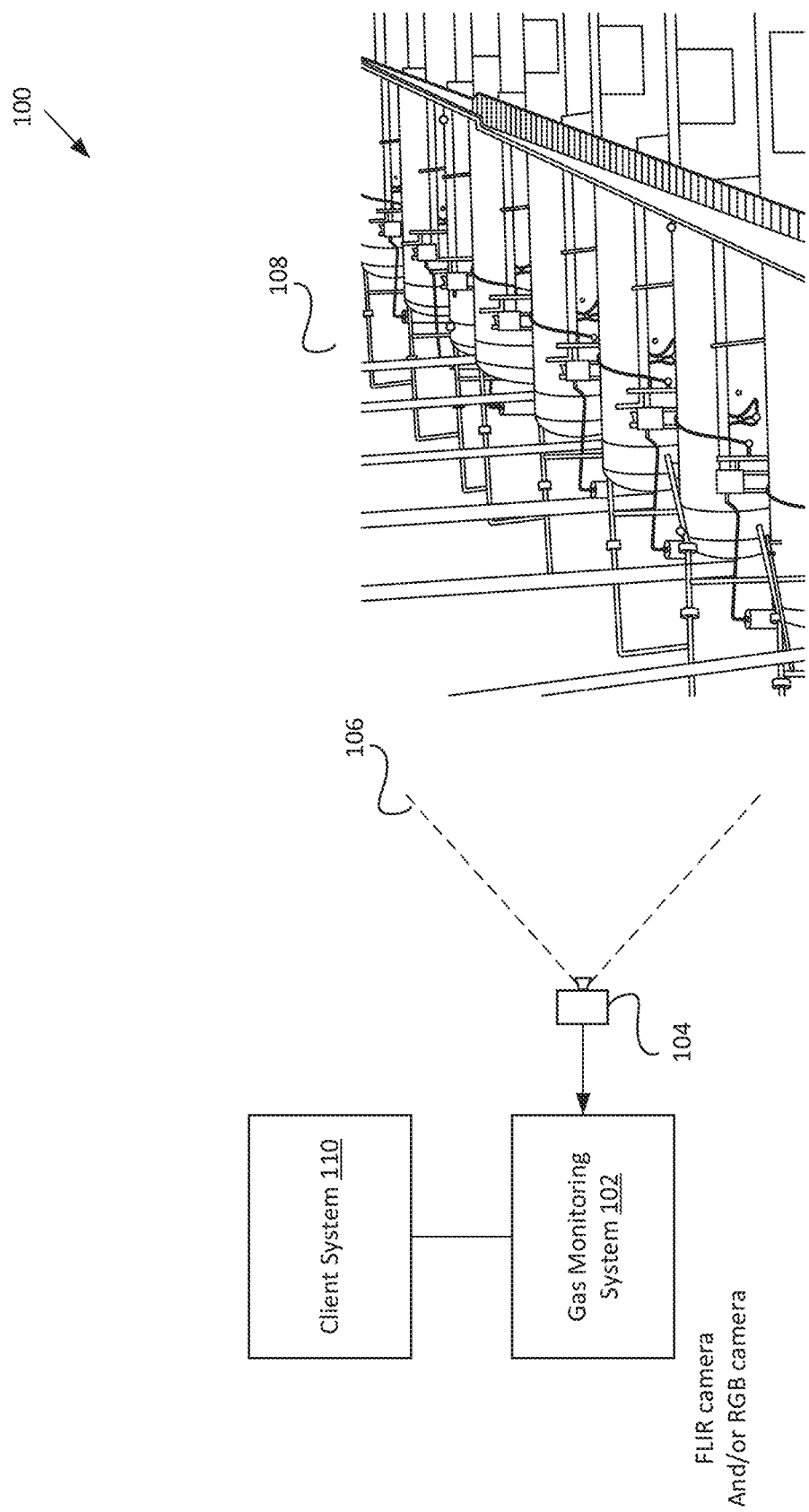
FIG. 1 depicts a block diagram of an example environment capable of monitoring gases according to some embodiments.

FIG. 1 depicts a block diagram of an example environment 100 capable of monitoring gases according to some embodiments. The example environment includes a gas monitoring system 102, an image capture device 104 with a field of view 106, gas station 108, and a client system 110.

FIG. 1 describes the gas monitoring system 102 as monitoring VOC gas leaks, however, the gas monitoring system 102 may monitor and detect gas leaks of many different types of gas (e.g., not all VOC gas). One of the characteristics of VOC gas is it evaporates at room temperature, making VOC gases difficult to image with traditional image capture devices such as charged coupled devices (CCD) and complementary metal-oxide-semiconductor (CMOS) image sensors.

In some embodiments, the gas monitoring system 102 utilizes image capture device 104 capable of capturing images in the infrared spectrum (IR). In one example, Forward-Looking Infrared (FLIR) cameras may be utilized to visualize or monitor VOC gases in remote and hazardous locations. FLIR cameras capture IR energy such as heat. In some embodiments, digital images outputted by FLIR cameras may be monochromatic images, with pixels representing an intensity of heat measured by the FLIR camera.

The image capture device 104 may be or include any number of cameras capable of capturing images or video in locations where VOC gas are found, such as gas stations or refineries. In one example, the image capture device 104 is positioned within 300 feet of oil and gas equipment. It will be appreciated that the image capture device 104 may be positioned overlooking gas equipment.

Multiple image capture devices may be placed in various locations throughout the gas station such that the field of view of the different image capture devices partially overlap. By overlapping some of the field of view of different image capture devices 104, the process of identifying and locating a gas leak (as well as the directional flow of the gas leak) may be simplified.

Gas leak detection cameras (e.g., those cameras capable of imaging in IR) may enable quick and safe detection and visualization of emission leaks. Quick detection and visualization of the leaks may allow leaks to be identified and quickly repaired, may reduce production inefficiencies, and may reduce damage to the environment caused by the release of toxic gases. Infrared absorption characteristics of infrared cameras, such as FLIR cameras, are wavelength-dependent. For example, image capture devices capable of detecting methane gas operate in the 3 to 5 μm range and use an indium antimonide (InSb) detector.

In some embodiments, the image capture devices 104 may include cameras that capture the visual spectrum only (e.g., not an IR camera). For example, an image capture device 104 may be an RGB camera (e.g., capable of capturing color images using a red-green-blue (RGB) image sensor). The field of view of the RGB image sensor(s) may be the same or substantially the same as that of one or more IR camera(s). The gas monitoring system 102 may combine information obtained from IR cameras and visual spectrum cameras to provide a combined image or visualization of a possible gas leak to a user interface on the client system 110. In this example, a gas leak detected using IR imaging (e.g., of an FLIR camera) is overlaid onto a color image (e.g., captured by an RGB camera).

Examples are discussed herein as combining information across IR images into a multi-channel image. The multi-channel image is described herein as an RGB image. In various embodiments, the multi-channel image is not limited to red, green, and blue, but may be any combination of colors or grayscales in any order.

As discussed herein, the gas monitoring system 102 may provide a visualization of the gas leak (e.g., based on an overlay of information received from the IR camera over an image from a non-IR camera) to a user interface on the client system 110. A gas leak detected using IR imaging (e.g., of an FLIR camera) may be overlaid onto a black and white image (e.g., captured by a black and white camera), a greyscale image, or a color image.

The gas monitoring system 102 may receive images and/or stream from the image capture device 104. In various embodiments, the gas monitoring system 102 utilizes one or more models from region-based convolution neural networks for gas leak identification.

In various embodiments, the gas monitoring system 102 selects images received from the image capture device 104 (e.g., from video) and locates each pixel of every object in the image, for instance, segmentation (e.g., using Mask R-CNN or any R-CNN process). For each image, the gas monitoring system 102 may create region proposals, classify the region proposals, and generate segmentation masks to identify potential leaks.

Figure 10:
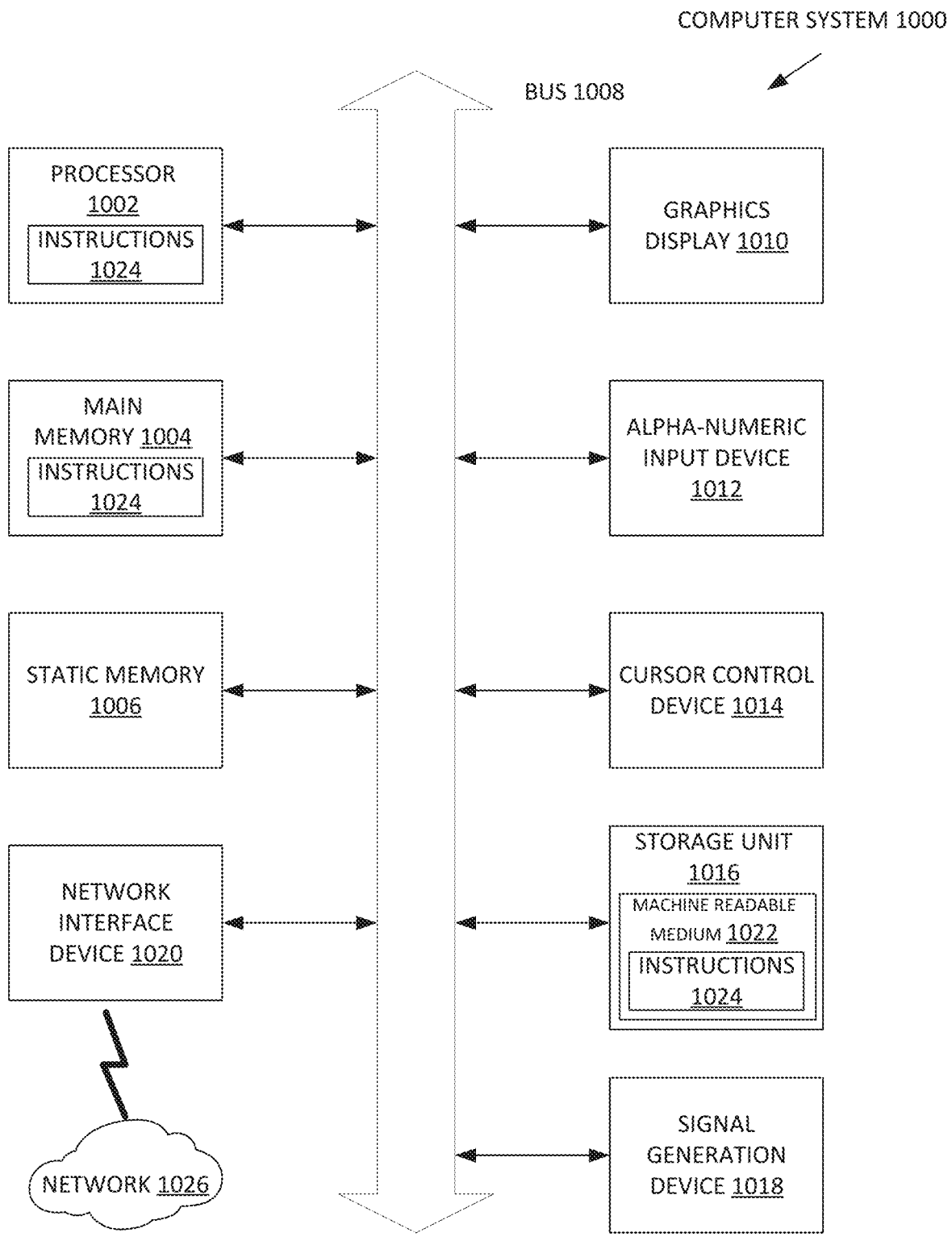
FIG. 10 depicts a block diagram of an example computing device according to some embodiments.

The gas monitoring system 102 and the client system 110 may be digital devices or collections of digital devices. A digital device is any device with at least one processor and memory. Example digital devices include a computer such as a laptop, personal computer, server, terminal, media tablet, smartwatch, smartphone, and/or the like. An example of a digital device is depicted in FIG. 10.

The client system 110 may be any digital device controlled by a user to assess images provided by the gas monitoring system 102 and/or receive notification of a gas leak from the gas monitoring system 102. In various embodiments, the client system 110 may communicate directly with the gas monitoring system 102 or over a communication network. In some embodiments, the client system 110 may communicate with a control system over a communication network to receive or view (e.g., the gas monitoring system 102 may communicate with the control system over the network). The control system may be a digital device or a collection of digital devices. In one example, the client system 110 may be a smartphone, tablet, personal computer, or the like, which may communicate with the gas monitoring system 102 over a network (e.g., WiFi, Internet, cellular network, Bluetooth, or the like).

The client system 110 may receive information (e.g., images, video, processing, features, or the like) from the gas monitoring system 102 regarding a gas leak and/or notify a user of the client system 110 of a gas leak. In some embodiments, a user (e.g., a client) may contact the client system 110 or the gas monitoring system 102 by navigating to a webpage that retrieves or receives information regarding a gas leak of the gas station 108 from the client system 110 and/or the gas monitoring system 102.

It may be appreciated that the gas monitoring system 102 may be or include a web server, server, or other device configured to receive images from any number of image capture devices (e.g., relayed by a local digital device in communication to a subset of the image capture devices) over a network. The gas monitoring system 102 may provide analysis, images, and/or alerts of detected gas leaks for any number of gas stations that are remote to each other.

Further, in some embodiments, the gas monitoring system 102 may receive images from gas stations that are commonly owned, or are owned by different entities. As such, the gas monitoring system 102 may be enabled to serve different entities with different subsets of gas stations. It may be appreciated that AI systems may be trained with any number of images from any number of gas stations (e.g., from the same or different owners) to improve gas leak recognition.

The gas station 108 may be or include any location with equipment for the purposes of storing, moving, or transporting gas (e.g., VOC gas).

The gas monitoring system 102 may identify region proposals in an image, classify the proposals, and generate bounding boxes or non-rectangular, polygonal shapes using a convolutional neural network. The gas monitoring system 102 may utilize a backbone network (e.g., a standard CNN). Earlier layers may detect low-level features while later features detect high-level features. A Feature Pyramid Network (FPN) is an extension of the backbone network which may represent objects at multiple scales. The FPN may include two pyramids where the second pyramid receives the high-level features from the first pyramid and passes them to the lower layers. This allows every level to have access to both lower and higher-level features.

The gas monitoring system 102 may utilize a Region Proposal Network (RPN) to scan the FPNs (e.g., apply a window across a feature map) and propose regions that may contain objects and representations (e.g., color changes depicted in a cloud) of a gas leak. The gas monitoring system 102 may utilize a set of boxes or non-rectangular, polygonal shapes (e.g., anchors) with defined locations and scales according to the input images. Individual sets of boxes or non-rectangular, polygonal shapes may be assigned classes. The RPN, in this example, may generate two outputs for each set of boxes or non-rectangular, polygonal shapes, including, for example, anchor class and bounding box/non-rectangular, polygonal shapes specifications. The anchor class may be either a foreground class or a background class.

The gas monitoring system 102 may utilize RoIAlign for convolutions in which a feature map is sampled at different points and then a bilinear interpolation is applied to get a precise idea of what would be at each pixel.

The gas monitoring system 102 then may utilize a convolutional network to take the regions selected by the ROI classifier (e.g., any number of support vector machines (SVMs)) and generate segmentation masks.

Figure 2:
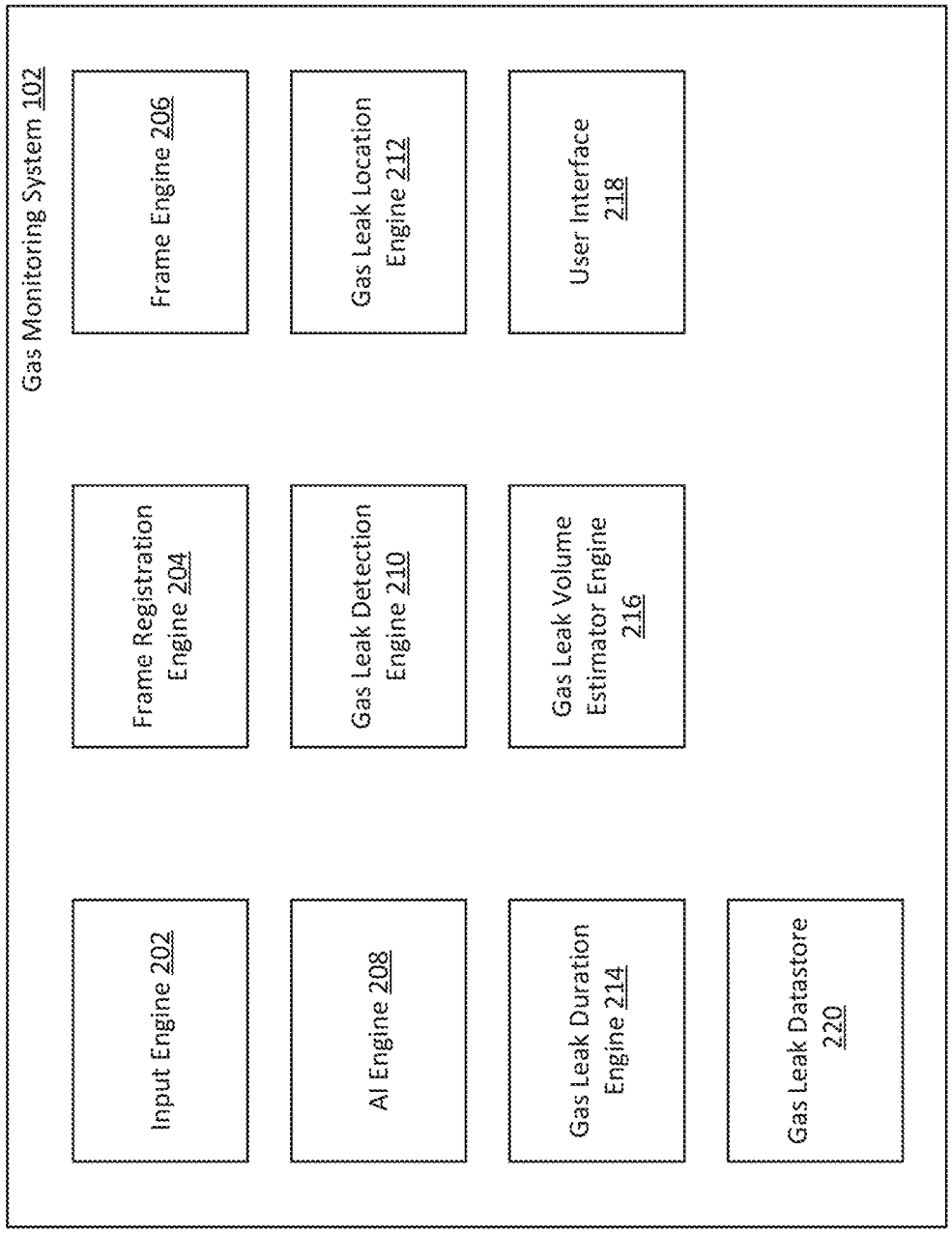
FIG. 2 depicts a block diagram of an example gas monitoring system according to some embodiments.

FIG. 2 depicts a block diagram of an example gas monitoring system 102 according to some embodiments. As discussed herein, the gas monitoring system 102 may include any number of digital devices. In one example, the gas monitoring system 102 includes at least one system-on-module (SOM) device, such as NVIDIA's Jetson AGX Xavier, memory, and a communication interface configured to receive images and/or streams from the image capture device 104.

The gas monitoring system 102 includes an input engine 202, a frame registration engine 204, a frame engine 206, an artificial intelligence (AI) engine 208, a gas leak detection engine 210, a gas leak location engine 212, a gas leak duration engine 214, a gas leak volume estimator engine 216, a user interface 218, and a gas leak datastore 220. The gas monitoring system 102 and the client system 110 may each be or include any number of digital devices.

The input engine 202 may be configured to receive and decode images and/or video from the image capture device(s) 104. In various embodiments, the input engine 202 takes images or slices of the video for further processing. The input engine 202 may select any number of the images (e.g., periodically select images) for processing by the frame registration engine 204. In some embodiments, the input engine 202 may receive video (e.g., at 10 frames-per-second (fps) from the FLIR camera) of the image capture device 104. The video or images received by the input engine 202 may be grayscale images (as is the case with IR imaging). In some embodiments, the input engine 202 may also receive images of the visual spectrum captured by other image capture devices. The images of the visual spectrum may be of the same or similar field of view as that of IR images. The input engine 202 may receive images at a pixel resolution (e.g., 320×240 pixels). In various embodiments, the input engine 202 receives images with a pixel resolution that is less than 320×240 pixels.

In various embodiments, the frame registration engine 204 may receive images from the input engine 202. In some embodiments, the frame registration engine 204 performs image stabilization of the received images by removing motion artifacts in the images. Motion artifacts may be caused by the motion of the image capture device due to vibration of platforms or mounts coupled to the image capture device, vibration of the equipment in the image capture device's 104 field of view, or weather such as wind, snow, or hail. In various embodiments, the image stabilization step may be the first step of a process of detecting gas leaks (e.g., VOC gas leaks). In some embodiments, the image stabilization step may be optional.

The frame registration engine 204 may apply a phase cross-correlation function to multiple pairs of offset video or image frames. Phase correlation estimates the relative translative offset between similar images or other data sets. The frame registration engine 204 may utilize frequency-domain data representation (e.g., using fast Fourier transforms).

For example, a phase cross-correlation function (e.g., utilizing python modules) may be applied to a pair of video frames captured at time t−2 and t−1, represented by (t−2, t−1), and video frames captured at time t−2 and t, represented by (t−2, t). For each pair of video frames, the phase cross-correlation function may offset or shift the second of the pair of video frames so that its field of view is the same or substantially the same as the first of the pair of video frames. Empty pixels resulting from the shift of the second pair of video frames may be substituted to compensate for the shift. In some embodiments, interpolation may be used to determine the substituted pixels. In some embodiments, the video frame captured at time t−1 represents a video frame that is one frame offset from the video frame captured at time t. In one embodiment, the video frame captured at time t−1 represents a video frame that is captured one second before the video frame captured at time t.

The frame registration engine 204 may further pass frames to the frame engine 206. The frame registration engine 204 may pass the original frame at time t−2 along with stabilized pairs to the frame engine 206. For example, the frame registration engine 204 may apply phase cross correlation (e.g., the phase_cross_correlation function from the scikit-image library with upsample_factor=4 and overlap_ratio=0.95) to frame pairs (t−2, t−1) and (t−2, t) (for frames with index t).

The output of the frame registration engine 204 may be a registered set of video or image frames which may be inputted to the frame engine 206.

The frame engine 206 may receive video or image frames from the input engine 202 or the frame registration engine 204. For example, three frames passed from the frame registration engine 204 may be converted to a single-channel grayscale image. The frame engine 206 may "stack" the three grayscale images to a single three channel image (e.g., placing three images in a time series in different color channels of an image). When these images are interpreted as a standard RGB image, they show a rainbow effect in areas of movement caught within the image (e.g., the movement being a change from one image relative to a different image at a previous time).

Figure 5:
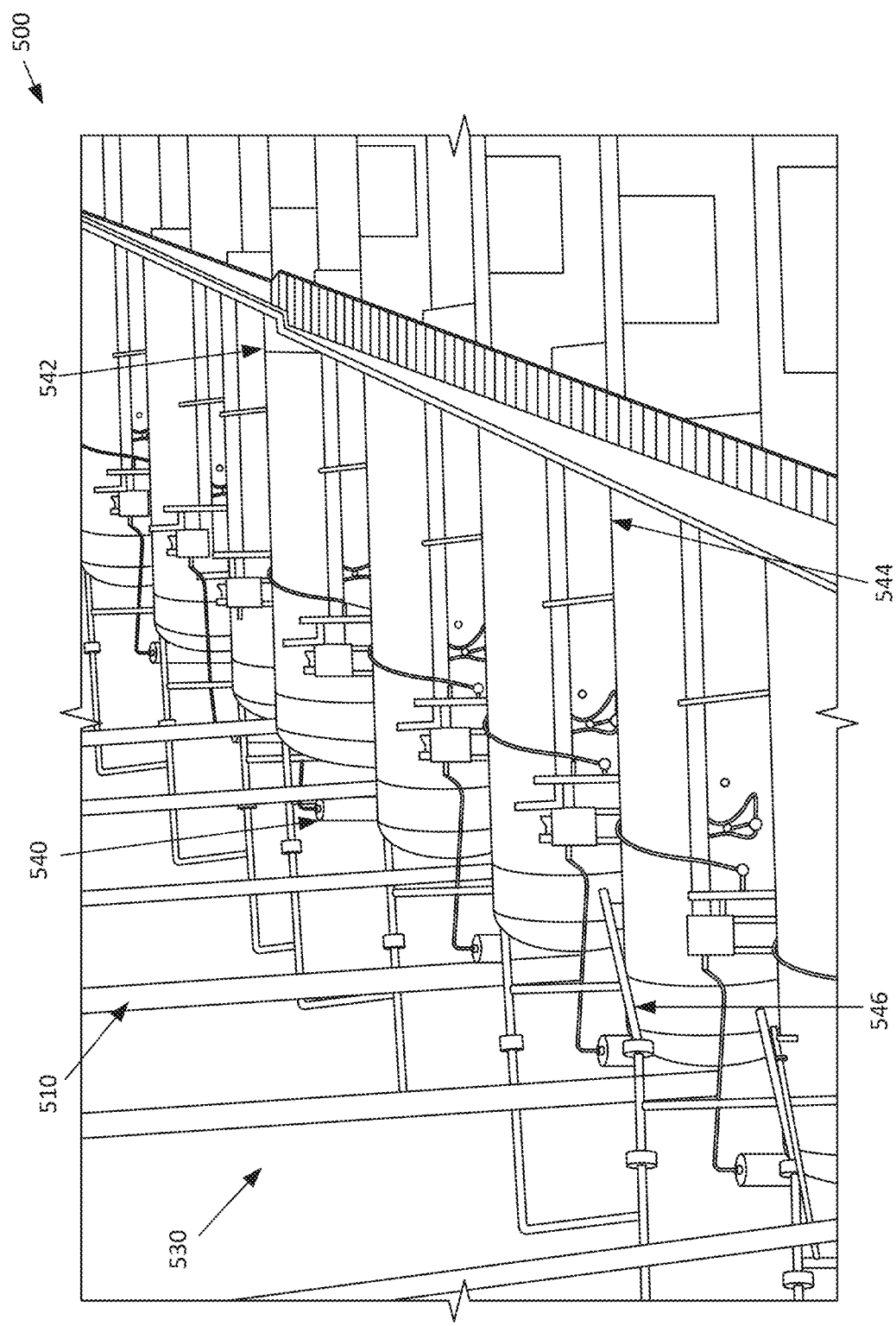
FIG. 5 depicts an example of an image captured by the image capture device of the gas monitoring system according to some embodiments.

In various embodiments, the frame engine 206 injects temporal information into RGB color channels by using three versions of the time series of grayscale images from the image capture device 104. For example, FIG. 5 is an example of an image 500 captured by the image capture device 104, such as an IR camera capable of detecting IR energy or heat and converting it into an electrical signal. Image 500 includes area 510, which represents a pipe which, at the time the image was captured, gives off more heat than another area, which represents one of the multiple tanks in the gas station. Area 530 may represent which represents a region in the refinery with little or no heat signature.

Two versions of the time-series of images from the image capture device 104 may be time-shifted, while a non-timeshifted video may round out the three versions of the time-series of grayscale images.

In some embodiments, the frame engine 206 may interpret the received images as a standard RGB image, where one set of images is interpreted with a red-color-channel. The intensity of the pixels which make up each image may be converted from black and white or gray monochrome to a red-tonal image, where the intensity or darkness of the red color is dependent on the intensity of the pixels which make up the image. The second set of images, which is a time-shifted or offset set of images, may be interpreted with a green-color-channel. Similar to the red-color-channel, the intensity of the pixels which make up each image is converted from a black and white, or gray monochrome, to a green-tonal image, where the intensity or darkness of the green color is dependent on the intensity of the pixels which make up the image. In the third set of images, which is a time-shifted or offset set of images, the offset is different from the offset of the second set of images and may be interpreted with a blue-color-channel. Similar to the red- and green-color-channel, the intensity of the pixels which make up each image is converted from black and white or gray monochrome to a blue-tonal image, where the intensity or darkness of the blue color is dependent on the intensity of the pixels, which make up the image.

In this way, stationary objects with a constant, substantially constant, or non-changing heat signature (such as tanks in a gas station, represented, for example, area 520 of FIG. 5) may have the same heat signature regardless of the time shift or offset. In this example, areas of the sets of images representing the stationary objects will have the same intensity in all three channels: red, green, and blue, since regardless of the time shift or offset, the heat signature of the stationary object remains substantially the same. Once the sets of images are stacked by the frame engine 206, areas of movement, such as VOC gas leaks, may be picked up by the different colored channels and, once stacked, may be shown in different colors. An example of this can be seen in FIG. 6.

Figure 6:
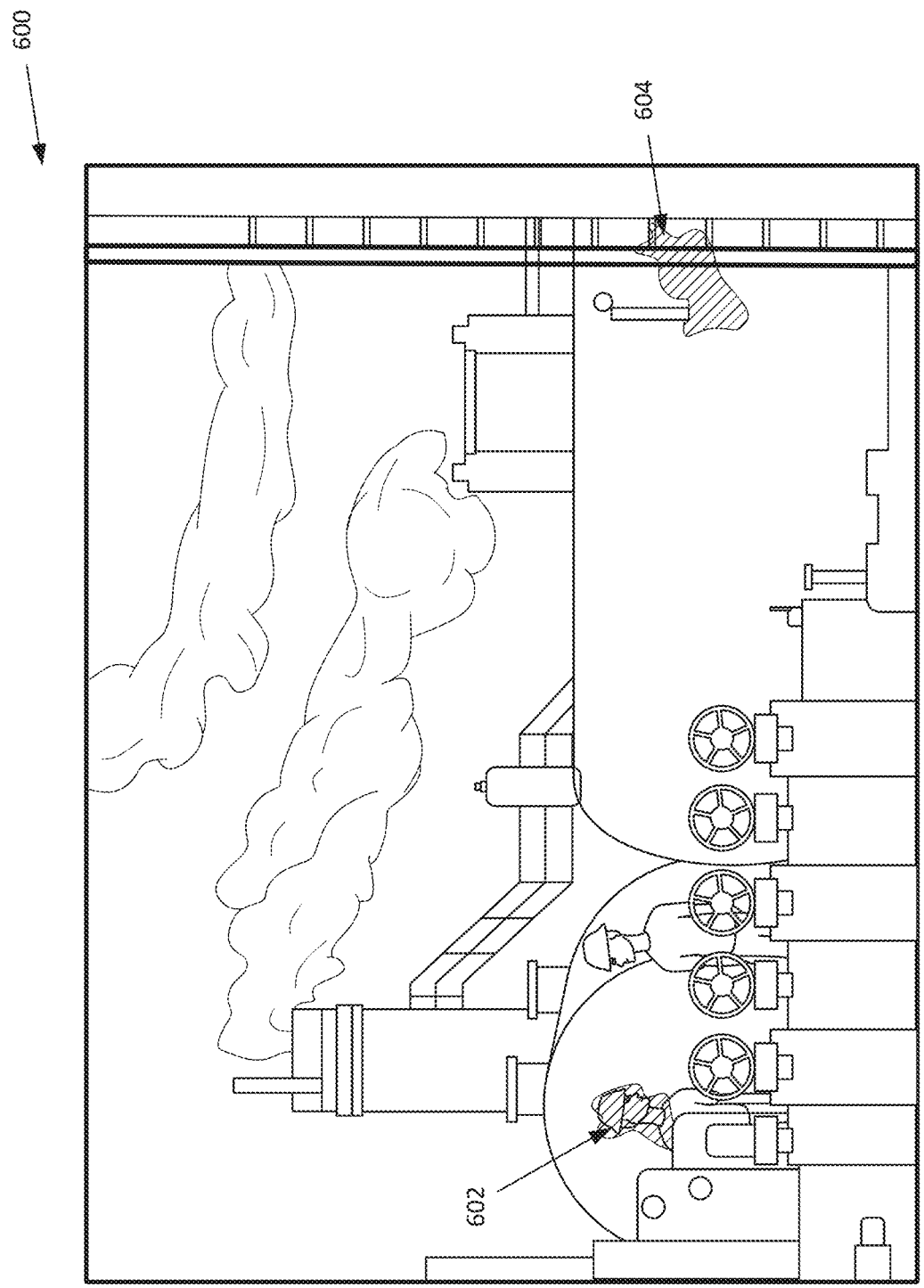
FIG. 6 depicts an example user interface of the gas monitoring system according to some embodiments.

FIG. 6 depicts a gas station view 600 with detected leaks in areas 602 and 604 in some embodiments. In one example, image capture devices 104 (e.g., IR image capture devices) may capture images of the scene depicted in FIG. 6. The frame registration engine 204 may apply a phase cross-correlation function to multiple pairs of offset video or image frames and the frame engine 206 may interpret the images as a standard RGB image as described.

Stationary objects with a constant, substantially constant, or non-changing heat signature in the gas station view 600 may have the same heat signature regardless of the time shift or offset. Once the sets of images are stacked by the frame engine 206, areas of movement, such as gas leaks in areas 602 and 604, may be picked up by the different colored channels and, once stacked, shown in different colors (e.g., red). In FIG. 6, the color of the gas leak has been converted to a shaded area to ease identification.

In various embodiments, one or more sets of images (e.g., each set including three stacked images in the colored channels described) may be provided to a digital device for display to the user. A set of images may indicate in color areas representing movement and may indicate a gas leak.

In some embodiments, the images may be automatically assessed using machine intelligence to detect gas leaks based on the stacked images and alert users when gas leaks are likely detected. The stacked image represents movement across the time of the individual images (e.g., at t−2, t−1, and t of the images). To determine if the movement (e.g., the colored area of a stacked image) is indicative of a gas leak and not other movement (e.g., of a worker, bird, object flying in the wind, or the like), an artificial intelligence (AI) system may be utilized.

In various embodiments, the AI engine 208 may receive the image sets from the frame engine 206. The AI engine 208 may assess a set of images (e.g., the stacked image) to identify objects and/or regions of interest (RoI) using a region proposal network (RPN) and score potential bounding boxes or non-rectangular, polygonal shapes (e.g., using a cls layer for scores and a reg layer for coordinates). Regions of interest may include, for example, colored or shaded areas indicating movement in the stacked images over the time intervals of the frames.

The Frame engine 206 may classify objects within the bounding boxes or non-rectangular, polygonal shapes using any number of SVMs. The Frame engine 206 may create segmentation masks and/or identify different movements (e.g., colored areas) associated with the different segmentation masks.

The AI engine 208 may apply any number of models to assist in proposing regions of interest, scoring RoIs, object classification, creating segmentation masks, and/or identifying different areas indicating movement within the image. For example, the Frame engine 206 may utilize models to create segmentation masks associated with qualifying regions of interest (using a CNN).

In some embodiments, the AI engine 208 may utilize models to create segmentation masks (e.g., associated with boxes or non-rectangular, polygonal shapes) within an image as gas leaks. The AI engine 208 may also use segmentation mask criteria to assist in limiting the objects of interest in the image. The segmentation mask criteria may identify characteristics of an RoI, bounding box, or non-rectangular, polygonal shape that are required to be satisfied to identify a gas leak (or likely gas leak). The segmentation mask criteria may include, for example, a range of sizes. In another example, the segmentation mask criteria may include a range of shapes. The method is further discussed herein.

The AI engine 208 may utilize models to create segmentation masks, to label or categorize objects in regions as gas leaks, or both.

The AI engine 208 may be configured to identify gas leaks associated with segmentation masks. The AI engine 208 may utilize models to identify gas leaks associated with the segmentation mask. The AI engine 208 may be configured to identify the objects that also satisfy the segmentation mask criteria. In various embodiments, the classification engine 208 identifies each object within different RoIs and/or segmentation masks as different gas leaks.

A training engine (not depicted and may be at the gas monitoring system 102 and/or other digital device) may utilize at least a portion of a training set of images and/or segmentation masks to train the AI modeling system to assist in identifying regions of interest within the image as being gas leaks for creating segmentation masks and/or categorize segmentation masks (e.g., non-rectangular, polygonal boxes) as gas leaks. The training engagement may utilize another portion of the training set to test to results of the AI modeling system.

The training engine may utilize hyperlabel to create a training set. The training set may be used to train a network such as the extractor (of regions), classifier, and the regressor for improved fitting of bounding boxes/non-rectangular, polygonal shapes to objects. Hyperlabel is a software application that enables users to draw shapes (e.g., non-rectangular, polygonal shapes or rectangular boxes) and/or label the shapes (e.g., categorize) in an image. For example, users may draw shapes (e.g., non-rectangular, polygonal shapes) around different gas leaks and/or label non-rectangular, polygonal shapes of an image as being gas leaks.

In some embodiments, a user may draw shapes around moving objects that are not gas leaks and categorize them as workers, birds, or other common objects that may be caught moving across images. Utilizing that information, the AI engine 208 may identify likely gas leaks and exclude other moving objects as being previously identified objects that are not gas leaks using the training.

The training set may be used to train the AI system. A loss function may be the combination of the class and intersection-over union of the guess of the AI engine 206. The loss function may utilize a gradient descent.

The segmentation mask criteria may include any kind of criteria that assists in the identification of a shape as being a cloud, leak, or the like. In some embodiments, the gas monitoring system 102 may be configured to track leaks as the gas emerges from equipment, pipes, fittings, valves, and/or the like.

The image capture device 104 may be positioned such that the field of view is directed to parts of a pipeline station. The segmentation mask criteria may include criteria that fit an expected non-rectangular, polygonal shape for the size and general shape (or shape sizes) of different gas leaks (e.g., of different clouds captured by the image capture devices). If a non-rectangular, polygonal shape of an object in an image does not fit the segmentation mask criteria, the gas monitoring system 102 may flag the object in future images to determine if the non-rectangular, polygonal shape in the image changes (e.g., separates to any number of non-rectangular, polygonal shapes that fit the segmentation mask criteria). If a bird, trash, or person moves across the field of view path for example, the gas monitoring system 102 may not flag the image since the moving object does not fit the segmentation mask criteria.

In some embodiments, the frame engine 206 may identify regions of interest of an image based on one or more models. The region of interest (RoI) may include qualities that make it a proposed region of interest based on qualities that satisfy a selection criteria, score, segmentation mask criteria and/or any number of models. The frame engine 206 may identify regions using non-rectangular, polygonal shapes and/or draw non-rectangular, polygonal shapes around qualifying proposed regions of interest based on the selection criteria, score, segmentation mask criteria and/or any number of models. Similarly, in some embodiments, the frame engine 206 may categorize or otherwise label objects in or associated with RoIs as gas leaks based on any criteria including or not including the segmentation mask criteria and/or any number of models.

In some embodiments, the AI engine 208 uses ResNet 101+FPN instance segmentation model to generate a list of detection areas (as binary masks) and detection confidences (floating point numbers between 0 and 1). The AI engine 208 may discard all detections with a confidence below 0.5, and convert the detection area masks into encapsulating polygons.

The gas leak detection engine 210 may receive the results from the AI engine 208 and notify the user if a colored cloud representing movement in the RGB image is classified as a gas leak (or a probability or confidence score is such that the colored cloud cannot be ruled out as a gas leak). The gas leak detection engine 210 may control the user interface 218 and/or the input engine 202 to provide a user or digital device a notification or alert. The notification or alert may indicate the presence of a possible gas leak, provide the RGB image, indicate a location of the gas leak (discussed herein), indicate a gas leak duration (discussed herein), indicate a volume and/or density of the gas leak (discussed herein), predict possible emergencies (discussed herein), include links to access the gas leak datastore 220 (to allow for monitoring to be assessed and the data, images, and events that led to the AI engine 208 determining a possible gas leak to be evaluated).

In various embodiments, the gas leak detection engine 210 is optional. For example, the user interface 218 may display or provide the RGB image with a colored cloud representing movement that may be related to a gas leak. In various embodiments, the AI engine 208 classifies colored clouds as a gas leak or possible gas leak based on previous training. The gas leak detection engine 210 may receive the information from the AI engine 208 and, based on the classification, provide notification and/or collects further information regarding the classification.

In various embodiments, once the gas leak detection engine 210 determines a gas leak has been classified, the gas leak detection engine 210 will request a gas leak location from the gas leak location engine 212, a duration of the gas leak (e.g., based on multiple images taken over time of the same field of view) from the gas leak duration engine 214, and/or estimates of volume and/or density (as well as predictions of lost gas, directionality of the gas from the gas leak, prediction of possible emergencies, and rate of change) from the gas leak volume estimator engine 216.

The gas leak location engine 212 may determine the location of each gas leak detected by the AI engine 208 and a map the location in the gas station. Each piece of equipment, such as pressure vessels, heat exchanges, storage tanks, and pump and compressors in the refinery facilitates, may be given a particular designation (e.g., an identifier), such as an equipment identification label (e.g., words, numbers, and/or a combination of both).

Once a gas leak is classified as such by the AI engine 208, the gas leak location engine 212 may associate the colored cloud representing the gas leak in the RGB image with one or more components of the gas station. For example, the gas leak location engine 212 may identify the pixels of the border of the colored cloud and determine proximity or overlap to pixels of any number of gas components. The gas leak location engine 212 may make location predictions based on overlap of the colored cloud and/or proximity of pixels to pixels of the gas components. The gas leak location engine 212 may then provide one or more identifiers of the gas components to the user interface 218 as identifying possible leaking components and/or position of the gas leak.

In some embodiments, the gas station, equipment, etc. may be associated with coordinates to assist in identifying a location. The gas leak location engine 212 may associate a detected leak (e.g., identified by the AI engine 208) with a location (e.g., equipment identifier and/or coordinates) to assist in determining a location of a gas leak. In some embodiments, satellite imagery of the gas station may be used to create or retrieve coordinates of the gas station. A gas components (e.g., equipment) may be associated with different coordinates and the equipment in each field of view of each image capture device 104 may be associated with coordinates (similar to the identifiers discussed above). As similarly discussed, the gas leak location engine 212 may determine location of the gas leak based on pixels of the colored cloud relative to pixels of gas components and then retrieve coordinates of those gas components closest and/or overlapped by the colored cloud to provide to the user interface 218.

Figure 4:
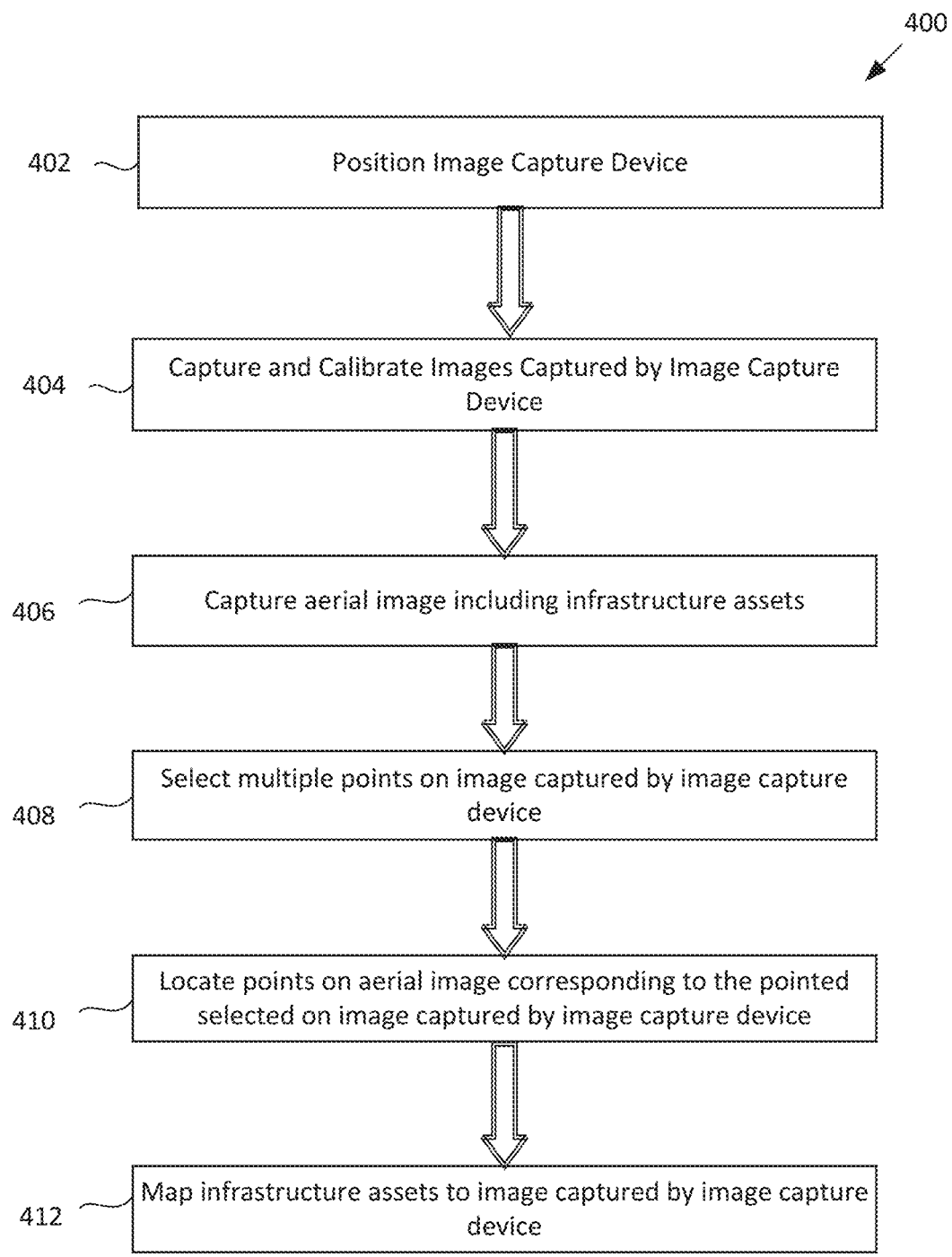
FIG. 4 is a flowchart of a process of mapping infrastructure assets to images captured by image capture devices of the gas monitoring system according to some embodiments.

In some embodiments, the gas leak location engine 212 may perform the steps of FIG. 4 (discussed herein), which maps infrastructure assets to images captured by image capture devices of the gas monitoring system according to some embodiments.

In some embodiments, the gas leak duration engine 214 determines the start of the gas leak and/or duration (e.g., length of time) of the gas leak. As discussed herein, images may be taken over time (e.g., a series of images taken over time). Metadata may be associated with the images that identify images and/or image sets with time (e.g., from a particular reference clock).

When the AI engine 208 determines a gas leak in a set of images, the gas leak duration engine 214 may assess the set of images and/or other sets of images that depict the same area or equipment that is proximate to the detected gas leak (e.g., proximate to the pixels representing the gas leak). The gas leak duration engine 214 may assess each image based on the AI engine 208 classifications to identify a time before the gas leak began (or was very low) as well as how long the leak has been present.

For example, the gas leak duration engine 214 determines that a particular gas leak started at time t if the AI engine 208 determines that a particular colored frame (e.g., green frame) of the three-channel image 780, time t detects a gas leak. The gas leak duration engine 214 may send a request to the gas leak datastore 220 to update a gas leak entry associated with the particular gas leak at a piece of particular refinery equipment.

In one embodiment, the gas leak volume estimator engine 216 may receive a request from the AI engine 208 or the gas leak detection engine 210 to estimate the volume and density of gas escaping at a particular time or over time. The gas leak volume estimator engine 216 may estimate the volume of gas by estimating a planar area occupied by the gas detected by the AI engine 208 at time t and estimating the pixel value of the pixels that represent the gas leak in an image captured by the image capture device at time t. These values may be used to determine an estimate of the volume of the gas leak at time t. The pixel value corresponds to the intensity of heat measured by the image capture device 104. Based on cloud size, the gas leak volume estimator engine 216 may further estimate a rate of change (e.g., increase of gas leak size) based on size of the colored cloud (e.g., pixels of the colored cloud) and density of the pixels in the colored cloud.

In some embodiments, the gas leak volume estimator engine 216 may evaluate representations of the gas leak in different images and/or other metrics of the representations of the gas leak over time to assist in determining the volume of the leak at a particular time. As discussed herein, the gas leak volume estimator engine 216 may estimate the volume of gas in any number of images by estimating a planar area occupied by the gas detected by the AI engine 208 at time t of each image and estimating the pixel intensity value of the pixels that represent the gas leak in each image captured by the image capture device at different times. These values may be used to determine an estimate of the volume of the gas leak at specific times. Further, the gas leak volume estimator engine 216 may estimate a total gas lost during times captured by the images based on estimates of volume.

In some embodiments, the gas leak volume estimator engine 216 may also determine when the gas leak began or began to be sufficiently serious (e.g., by comparing estimates of gas volume to a predetermined gas volume threshold). For example, the gas leak volume estimator engine 216 may evaluate each image and determine when the gas leak was not present or was present but not detected. In some embodiments, the gas leak volume estimator engine 216 may compare an estimate of a volume of a gas leak in one image to determine a degree of seriousness and/or determine when to notify a user of the gas leak (e.g., notifying or providing an alarm when the volume of a suspected gas leak is above a particular threshold). In addition to or instead of volume, the gas leak volume estimator engine 216 may determine the density of the gas detected by estimating the pixel intensity value of the pixels that represent the gas leak.

Weather may play a factor in determining the density of gas detected by the AI engine 208. For example, the ambient temperature, wind speed, and wind direction may have an effect on the dispersal rate of the emitted gas and may affect the detected density of the emitted gas. In some embodiments, the gas leak volume estimator engine 216 may retrieve or receive local weather reporting (e.g., local or hyperlocal reports) from weather reporting websites, datastores, smartphone apps, or the like. The local weather reporting may include ambient temperature, wind speed, and/or wind direction. In some embodiments, measurements of temperature, wind speed, and/or wind direction may be taken at the gas station using local sensors (e.g., temperature sensors, weather vanes, and/or other devices). Using the additional information, the gas leak volume estimator engine 216 may change an assessment of the volume and/or density estimate of a gas leak.

In some embodiments, the gas leak volume estimator engine 216 may also provide information on the spread or direction of the escaped gas from the gas leak. As such, the gas leak volume estimator engine 216 may estimate the direction of the escaped gas, environmental impact, dangers to people, the possibility of explosion (e.g., if gas is escaping towards open flames or welding), and/or the like. The gas leak volume estimator engine 216 may assess directionality, rate of change of the gas leak over time (e.g., captured by the images over time), as well as density/volume of the gas over images over time. The gas leak volume estimator engine 216 may predict when gas may reach certain locations, predict when the gas is dense enough to constitute a hazard, and/or predict the possibility of an emergency (e.g., the possibility of explosion, risk to human life, and/or damage to equipment).

The user interface 218 may provide depictions or representations of gas leaks. In various embodiments, the user interface 218 may provide information and images related to the gas station. For example, the user interface 218 may provide images from the IR image capture devices, visual image capture devices, multi-color channel (RGB) representations of gas leaks, estimates of the density of gas leaks, estimates of the volume of gas leaks, notifications of gas leaks, indications when the gas leaks began, and/or location of gas leaks. The user interface 218 may provide the information and/or images directly (e.g., as a webserver providing the information on a web page) or indirectly (e.g., to an application or browser on a user device over a network).

In various embodiments, the user interface 218 may provide access to the gas leak datastore and/or provide information regarding the discovery of gas leaks, information used to detect gas leaks, metrics and/or other estimates regarding the leaks, information used to evaluate density/volume, information used to determine location, and/or the like. For example, the input engine 202 or user interface 218 may store and relate information that is associated with a particular gas leak. Once detected, the input engine 202 or user interface 218 may collect images of the area of the gas leak, collect estimates and/or evaluations of any part of the gas leak, configurations of the AI system, outputs, and the like and store a report (or the combined information) in the gas leak datastore. As such, a user or government entity may access the gas leak datastore to browse or retrieve the images or information to confirm the existence of the gas leak, proper functioning of the gas monitoring system 102 (e.g., for reliability), the precision of the gas monitoring system 102, the possible impact of escaped gas, adherence to rules and regulations f the system and/or the gas station) and/or the like.

The gas leak datastore 220 may be any data structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The gas leak datastore 220 may store a stream from the image capture device 104. The gas leak datastore 220 may also store the segmentation masks/non-rectangular, polygonal shapes identified in different images and track which shapes are associated with gas leaks over time. The gas leak datastore 220 may track the stream, images, processed images, and the like for any number of gas leaks from any number of image capture devices 104 over any number of refinery equipment. In some embodiments, the gas leak datastore 220 may include gas leak entries associated with each gas leak detected by the AI engine 208

It will be appreciated that utilizing the gas monitoring system 102 as discussed herein may greatly reduce errors caused by manual detection (e.g., manual detection often misses many gas leaks, is not constantly available, lacks monitoring, lacks tracking and information/image collection over time, and the like). Further, detecting or monitoring gas station equipment may be performed without distractions and without manual intervention. Further, employees (e.g., refinery employees) may stay warm as the need to go outside decreases. Similarly, employee safety is improved by keeping employees out of areas with possible gas leaks (e.g., that are not detectable with technology in the prior art) which may be unhealthy to breath and/or expose workers to fire and explosions.

Moreover, manual and preexisting methods for gas leak detection is inadequate to estimate possible direction of gas from gas leaks because they do not use imagery to capture possible leaks. As further follows, manual and preexisting methods cannot estimate volume of gas leak from the evidence of the leak (e.g., the image); the prior art may be limited to estimates of volume of lost gas by partially or completely relying on measurements of stored gas against the expected amount of stored gas (as opposed to measuring the lost gas from imagery representing the gas leak). As further follows, preexisting methods are insufficient to determine density of the gas leak, volume of the gas leak, and possible emergencies that may be caused by directionality, rate of change, density, and/or volume of the gas leak, and the like. Similarly, the prior methods cannot determine location of the gas leak based only on a lack of expected gas in storage because the leak could be at any point in the storage container or equipment leading to the storage container. The imagery discussed herein, on the other hand, indicates a position to address breaches, poor equipment fittings, and the like to address the problem before additional gas escapes.

Figure 3:
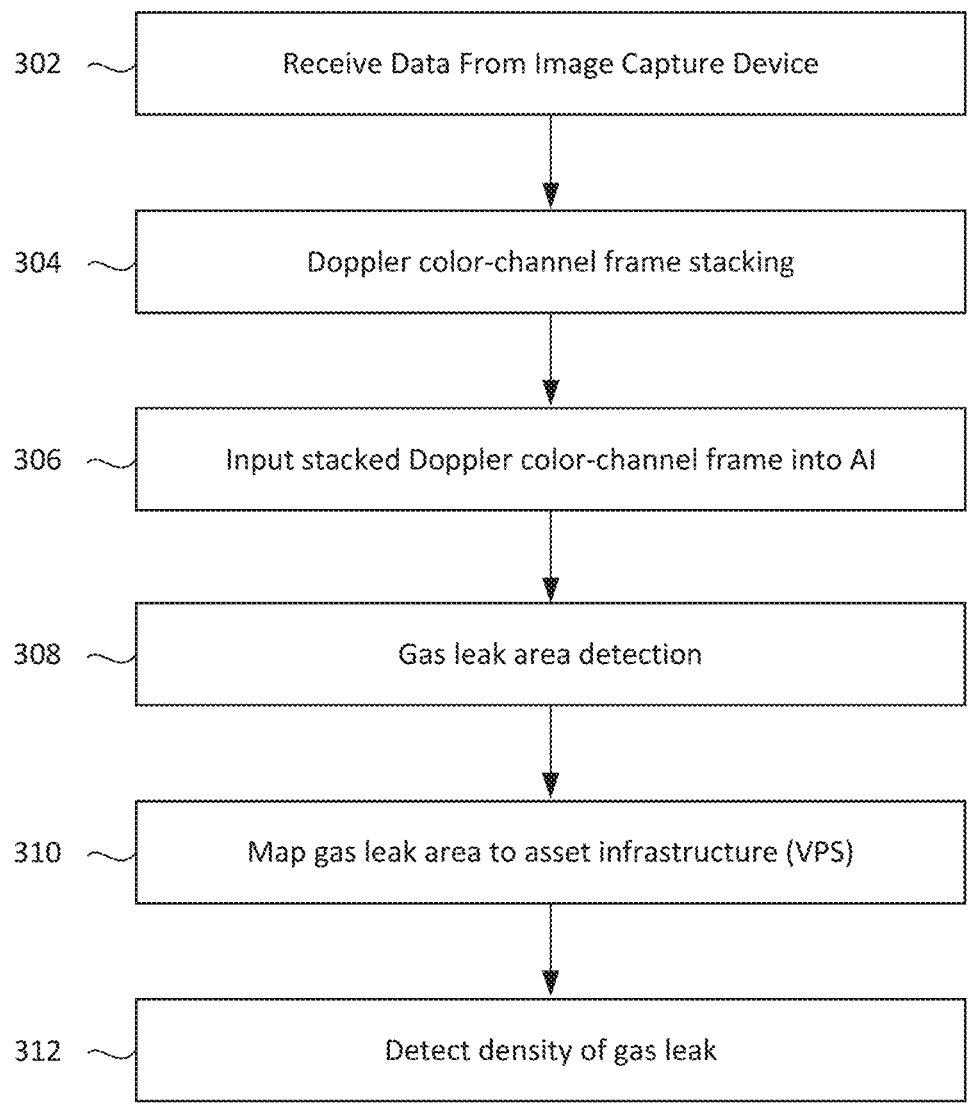
FIG. 3 is a flowchart of a process of detecting gas leaks according to some embodiments.

FIG. 3 is a flowchart 300 depicting a process of detecting gas leaks according to some embodiments. In the example of FIG. 3, the image capture device 104 provides images to the gas monitoring system 102. The gas monitoring system 102 may provide notification of a gas leak to the client system 110.

In step 302, the input engine 202 receives a stream from an image capture device 104 with a particular field of view of a portion of the gas station. In various embodiments, the image capture device 104 is stationary and the field of view does not intentionally move. The image capture device 104 may provide video or a stream at any speed. In some examples, the image capture device 104 provides a stream at 10 fps.

In one example, the image capture device 104 is an IR device and is positioned with a field of view of pressure vessels, heat exchanges, storage tanks, and pumps, and compressors found in gas station facilities or manufacturing plants. In various embodiments, the image capture device 104 is an IR camera (e.g., an FLIR camera), which detects the infrared spectrum (e.g., heat) and converts it to a digital image. Digital images outputted by IR cameras may be monochromatic images, with pixels representing an intensity of heat measured by the IR camera. For example, view 600 (which may be presented in a user interface) depicted in FIG. 6 shows an area of a storage tank that faces that sun and therefore may be warmer than another area of the storage tank. Due to the difference in the heat signature between the two areas, the area facing the sun may appear to be brighter or lighter than the area not facing the sun.

In step 304, the frame engine 206 may receive the video or image frames from the frame registration engine 204. In various embodiments, step 302 is optional, in which case the frame engine 206 receives the video or image frames from the input engine 202. The frame engine 206 may inject temporal information into RGB color channels by using three versions of the time series of grayscale images from the image capture device 104.

Figure 7A:
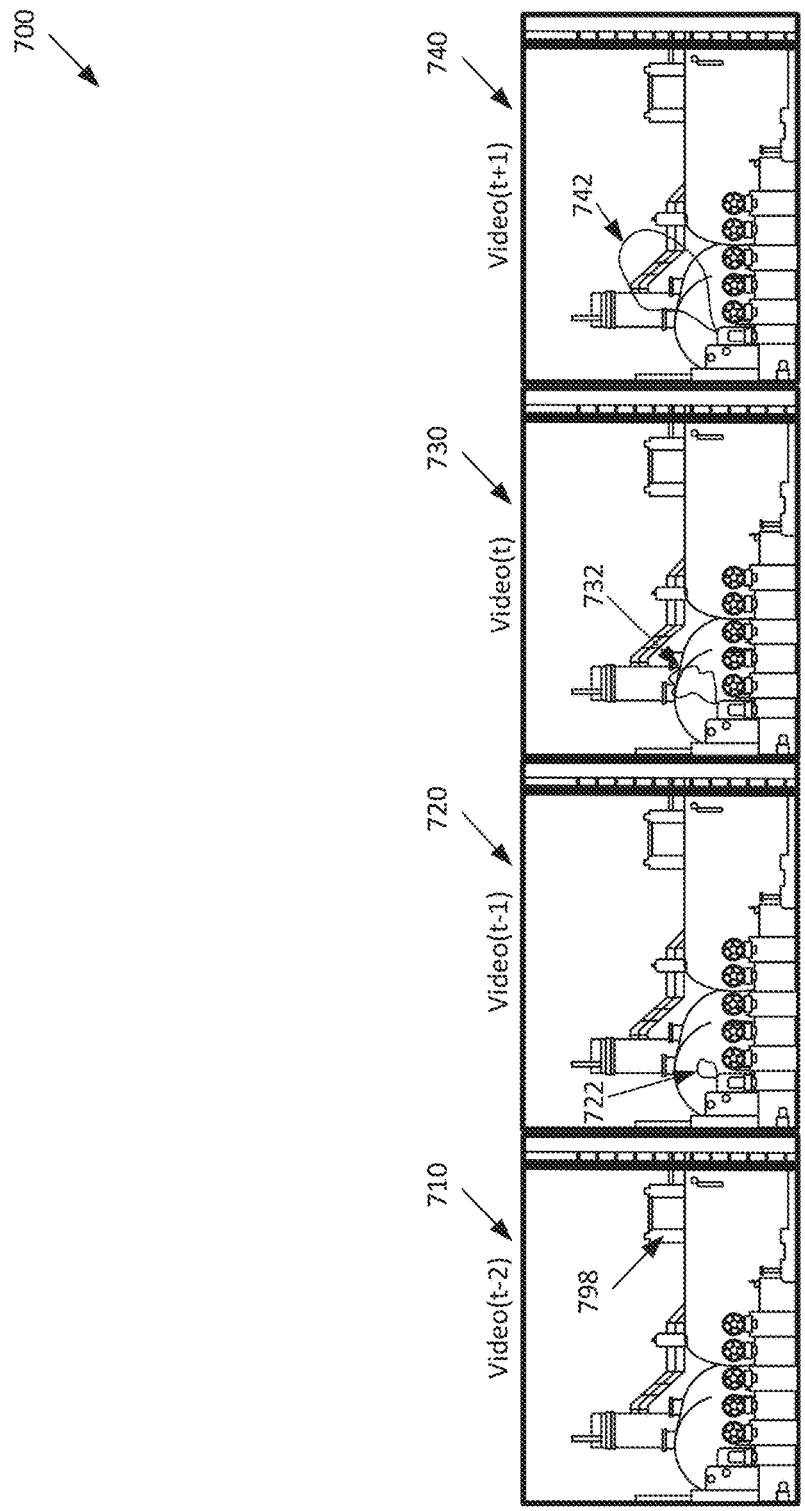
FIG. 7A is an example set of video frames captured by the image capture device according to some embodiments.

An example of a set of video frames 700 captured by the image capture device 104 can be seen in FIG. 7A. A frame 710 corresponds to a video frame captured at time t−2, a frame 720 corresponds to a video frame captured at time t−1, a frame 730 corresponds to a video frame captured at time t, and a frame 740 corresponds to a video frame captured at time t+1. For simplicity, a line reproduction of the IR image is captured by the image capture device of the gas monitoring system. It will be appreciated that a set of frames may include any number of images that are more the two (e.g., three images, four images, or more).

Area 722 of frame 720 depicts a gas leak event at time t−1. The emission of gas may not be visible to the naked eye and require IR cameras to pick up its presence. The gas being squeezed through a leak in equipment and moving through air at a particular velocity may lower the temperature of the escaping gas which may be detectable by the IR cameras.

At time t, the image capture device 104 captures frame 730, which includes a depiction of the emission at area 732. At time t+1, the image capture device 104 captures frame 740, which includes a depiction of the emission at area 742. As can be seen in frames 720 through 740, the size of a gas cloud increases, though it may be difficult to view, especially if the emission of the gases (e.g., VOC gases) does not have a large heat signature compared to the heat given off by the area surrounding the emitted gases.

Figure 8:
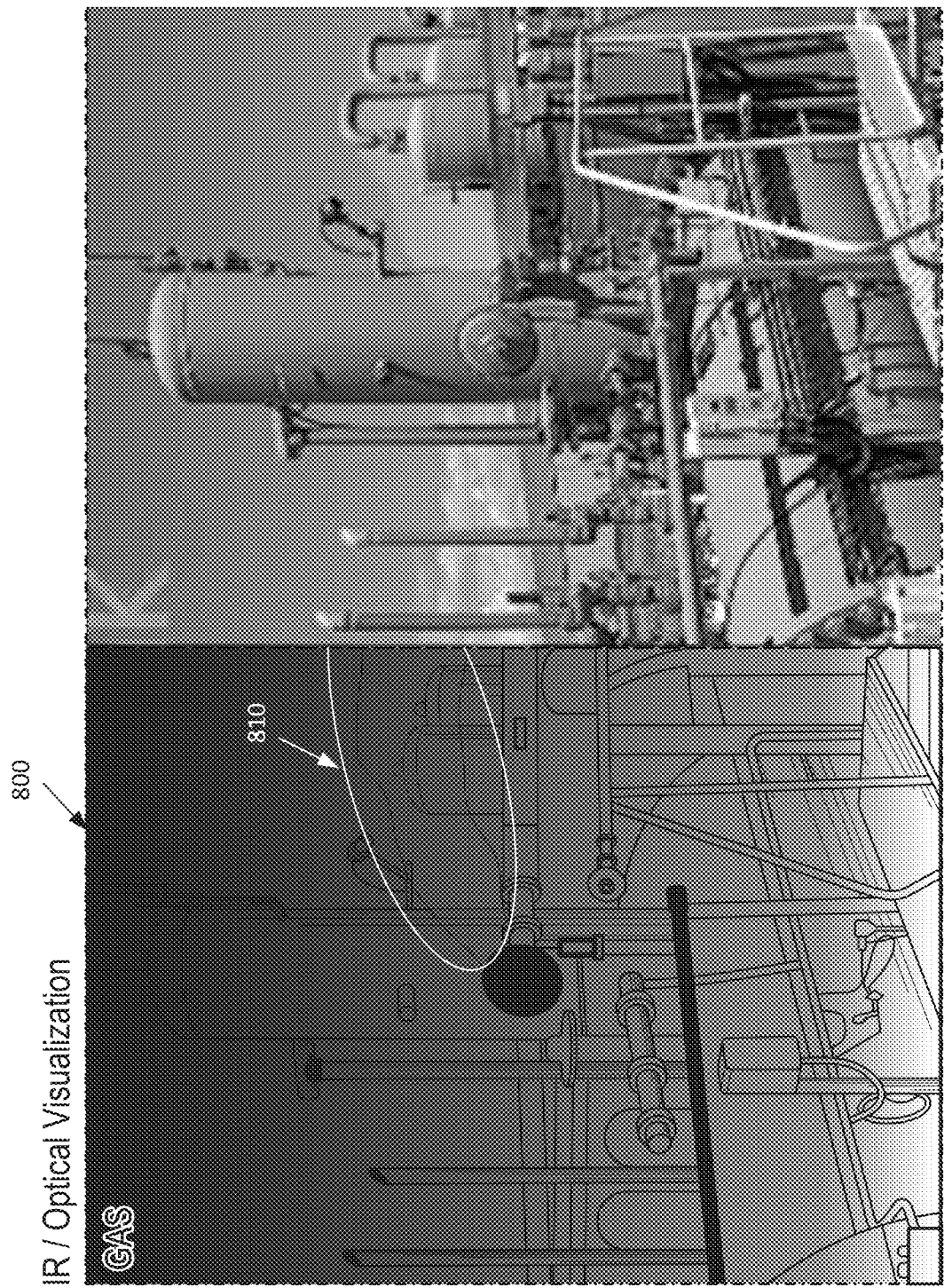
FIG. 8 depicts an example of an IR visualization and an IR-Optical visualization of a gas leak according to some embodiments.

An example of this can be seen in FIG. 8, an IR visualization 800 of an example gas emission can be seen in area 810. The area which represents the gas emission can barely be seen in the IR visualization 800, which is in grayscale.

In addition to making the gas emission more visible on a user interface, the frame engine 206 may inject temporal information into RGB color channels from a grayscale image. The frame engine 206 may make two copies of the video frames 700 of FIG. 7A, offset each of the two copies by a different offset value to generate three sets of frames or images. Each of the three sets of frames or images may be interpreted with a different one of a red, green, or blue channel (or using any multichannel image regardless of whether they are colored channels or are channels of colors other than red, green, and blue). This may be accomplished without the use of a CMOS image sensor. The interpretation of the three sets of frames with a different one of the red, green, or blue channels may be accomplished with software. The intensity of the pixels which make up each image may be converted from black and white or gray monochrome to an RGB-tonal image, where the intensity or darkness of the RGB color is dependent on the intensity of the pixels which make up the image.

Figure 7B:
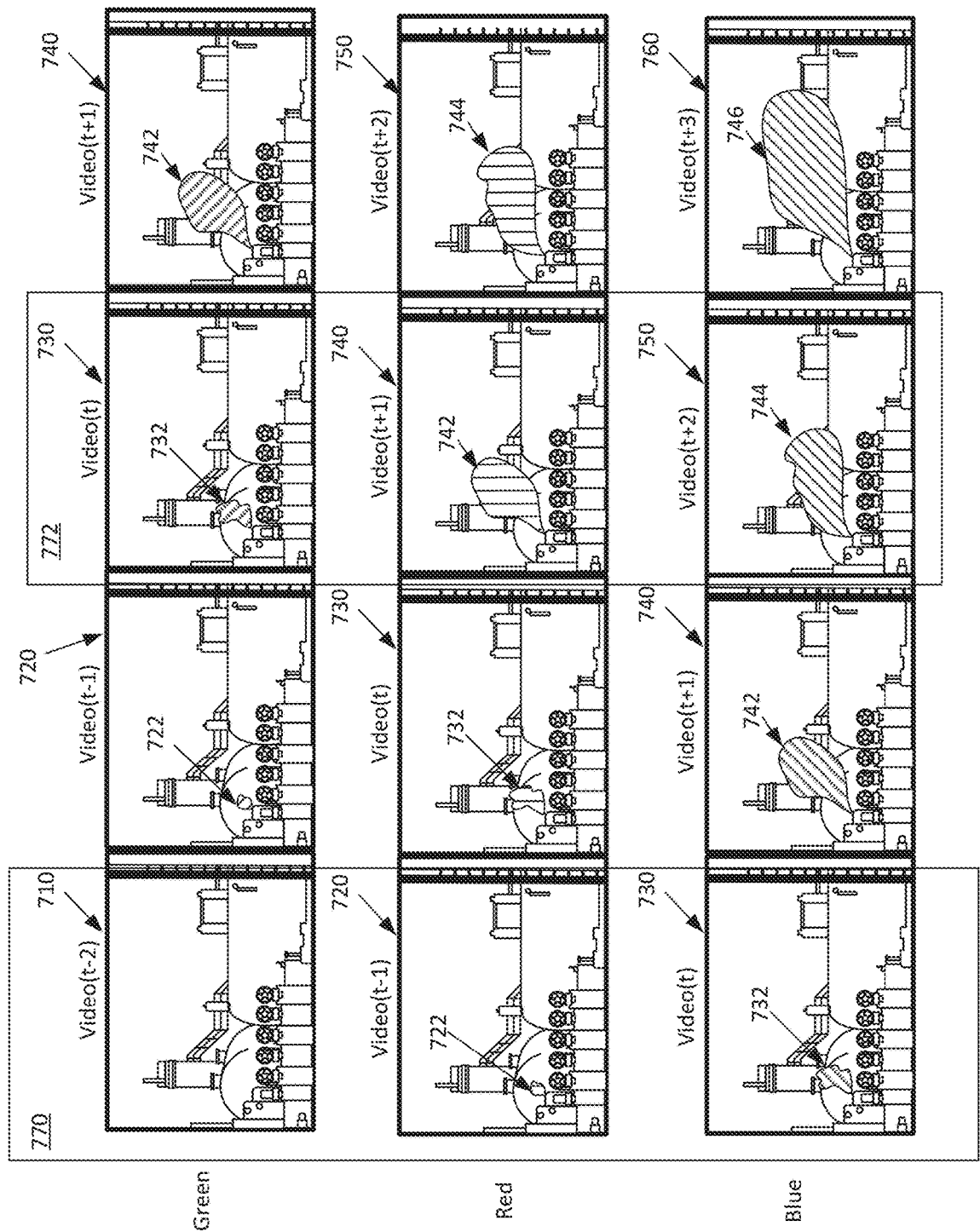
FIG. 7B depicts an example of a frame according to some embodiments.

FIG. 7B shows an example of three sets of images that are "stacked" to produce an RGB image 770. Different combinations of images may be combined to create different RGB images (e.g., multi-channel images). For example, frames 710, 720, and 730 may be combined to form RGB image 770. Similarly, frames 720, 730, and 740 may be combined to form another RGB image. In another example, frames 730, 740, and 750 may be combined to form RGB image 772. Although the channels are indicated as green, red, and blue, it will be appreciated that the colors may be in any order, be different colors, or be different variations of shading (e.g., in grayscale).

In the example of FIG. 7A, the video frame 710 is interpreted with a green-color-channel and is the original, non-time-shifted video frame. For simplicity, only the pixels which make up a changing heat signature comprising the gas emission are shown in a pattern fill. As seen in frames 720 through 740, areas 722, 732, and 742 of frames 720, 730, and 740, respectively, represent the increasing size of the gas emission (e.g., a gas leak) as picked up by the image capture device in the infrared spectrum.

Frames 720 through 750 depict a gas leak at time t-1 through t+2. Frames 720 through 750 represent a time-shifted version of the video frames of the frames 720 through 740. In some embodiments, the frames 720 through 750 are interpreted with a red-color-channel. For simplicity, only the pixels which make up a changing heat signature comprising the gas emission are shown in a pattern fill. As seen in frames 720 through 750, areas 722, 732, 742, and 744 of frames 720, 730, 740, and 750 respectively represent the increasing size of the gas emission as picked up by the image capture device.

Frames 730 through 760 depict a gas leak at time t through t+3. Frames 730 through 760 represent another time-shifted version of the video frames of the frames 730 and 740. The amount of time-shift or offset is different from that of frames 720 through 750. In some embodiments, the video frames 730 through 760 are interpreted with a blue-color-channel. For simplicity, only the pixels which make up a changing heat signature comprising the gas emission are shown in a pattern fill. As seen in frames 730 through 760, areas 732, 742, 744, and 746 of frames 730, 740, 750, and 760, respectively, represent the increasing size of the gas emission as picked up by the image capture device.

Figure 7C:
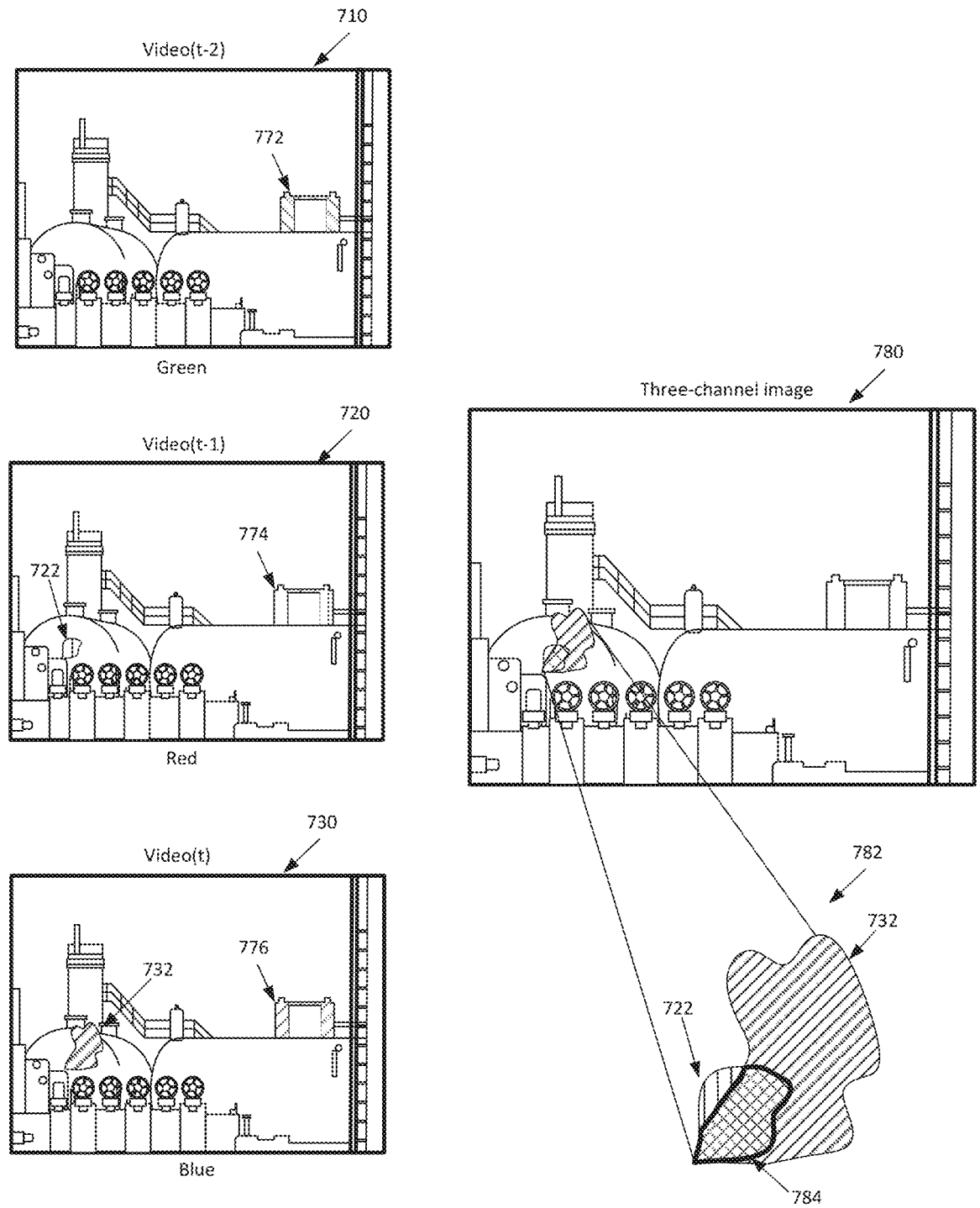
FIG. 7C depicts one example of stacking three frames into one three-channel image according to some embodiments.

FIG. 7C shows in further detail one stacking of three frames, frames 710, 720, and 730, into a three-channel image according to some embodiments. Recall that these frames are grayscale images, as is usually the case with IR imaging. The intensity, or brightness, of the pixels which make up each grayscale image, is dependent on the intensity of the heat measured by the image capture device 104.

In some embodiments, the intensity of the green color of frame 710 is dependent on the intensity of the pixels of the grayscale image captured at time t-2, which in turn depends on the amount of heat captured by the image capture device 104. Similarly, the intensity of the red color of frame 720 is dependent on the intensity of the pixels of the grayscale image captured at time t-1. Frame 720 includes area 722, which represents a gas emission at time t-1. The gas emission is a heat signature that was not present in frame 710, captured by time t-2. Likewise, the intensity of the blue color of frame 730 is dependent on the intensity of the pixels of the grayscale image captured at time t. Frame 730 includes area 732, which represents the gas emission at time t. In various embodiments, the intensity of the red color, as provided or outputted to the user interface, does not depend on the amount of heat captured by the image capture device 104. Similarly, the intensity of the non-grayscale colors provided or outputted to the user interface does not depend on the heat captured by the image capture device 104. For example, the intensity of the blue color outputted in area 742 may not depend on the intensity of the pixels of the grayscale image captured at time t.

Once the frame engine 206 stacks frames 710, 720, and 730, the frame engine 206 may output a three-channel image 780. The three-channel image 780 includes a composite area 782, which includes area 722, which represents the gas emission at time t-1. This area may be provided or outputted to a user interface in red. Composite area 782 also includes area 732, which represents the gas emission at time t. This area may be provided or outputted to the user interface in blue. Composite area 782 may be in color, as opposed to the grayscale image. A section 784 of the composite area 782 in which the red color and blue color overlaps may be outputted to the user interface in magenta or a different color to differentiate it from the other colors of the gas leak present in some images but not in others. In some embodiments, the intensity of the red color, as provided or outputted to the user interface, may depend on the amount of heat captured by the image capture device.

Stationary objects with a constant, substantially constant, or non-changing heat signature, such as tanks in a gas station, may be provided or outputted in a set of images and/or to a user interface in grayscale, with the outputted grayscale corresponding to the intensity of heat measured by the image capture device 104. Since the stationary object has a constant, or substantially content heat signature, the intensity of heat measured by the image capture device 104 may be the same, or substantially the same, regardless of when the heat signature of the object was captured. For example, a piece of particular equipment captured at time t-2 by the image capture device 104 as frame 710 may have a particular pixel value (e.g., a particular intensity). Once the frame 710 is interpreted as a green-color-channel, an intensity of the particular refinery equipment may be assigned according to the particular pixel value. Area 798 of frame 710 may correspond to the particular refinery equipment. As previously mentioned, the particular refinery equipment is stationary objects with a constant, substantially constant, or non-changing heat signature.

In some embodiments, objects with a constant, substantially constant, or non-changing heat signature that are not stationary, such as a person moving around, may be provided or outputted to the user interface in grayscale. The outputted grayscale corresponding to the intensity of heat measured by the image capture device 104. In various embodiments, the AI engine 208 may recognize that these objects are not gas leaks.

At time t−1, the heat signature of the particular refinery equipment is captured by the image capture device 104 in frame 720 with substantially the same pixel value (e.g., a particular intensity). Once the frame 720 is interpreted as a red-color-channel, an intensity of the particular refinery equipment may be assigned according to the particular pixel value. Area 774 of frame 720 may correspond to the particular refinery equipment.

At time t, the heat signature of the particular refinery equipment is captured by the image capture device 104 in frame 730 with substantially the same pixel value (e.g., a particular intensity). Once the frame 730 is interpreted as a blue-color-channel, an intensity of the particular refinery equipment may be assigned according to the particular pixel value. Area 776 of frame 730 may correspond to the particular refinery equipment.

The frame engine 206 may determine that a region, the same region, of the three frames 710, 720, and 730 corresponding to the particular refinery equipment has the same, or substantially the same, particular pixel value (e.g., grey or an overlap of colors). For that reason, the frame engine 206 may not provide the particular refinery equipment to the user interface in grayscale.

In some embodiments, pixel values correspond to the intensity of heat measured by the image capture device 104. Pixel values are integers that range from 0 (black) to 255 (white), where a pixel value of 0 corresponds to the pixel detecting little to no heat signature.

Figure 7D:
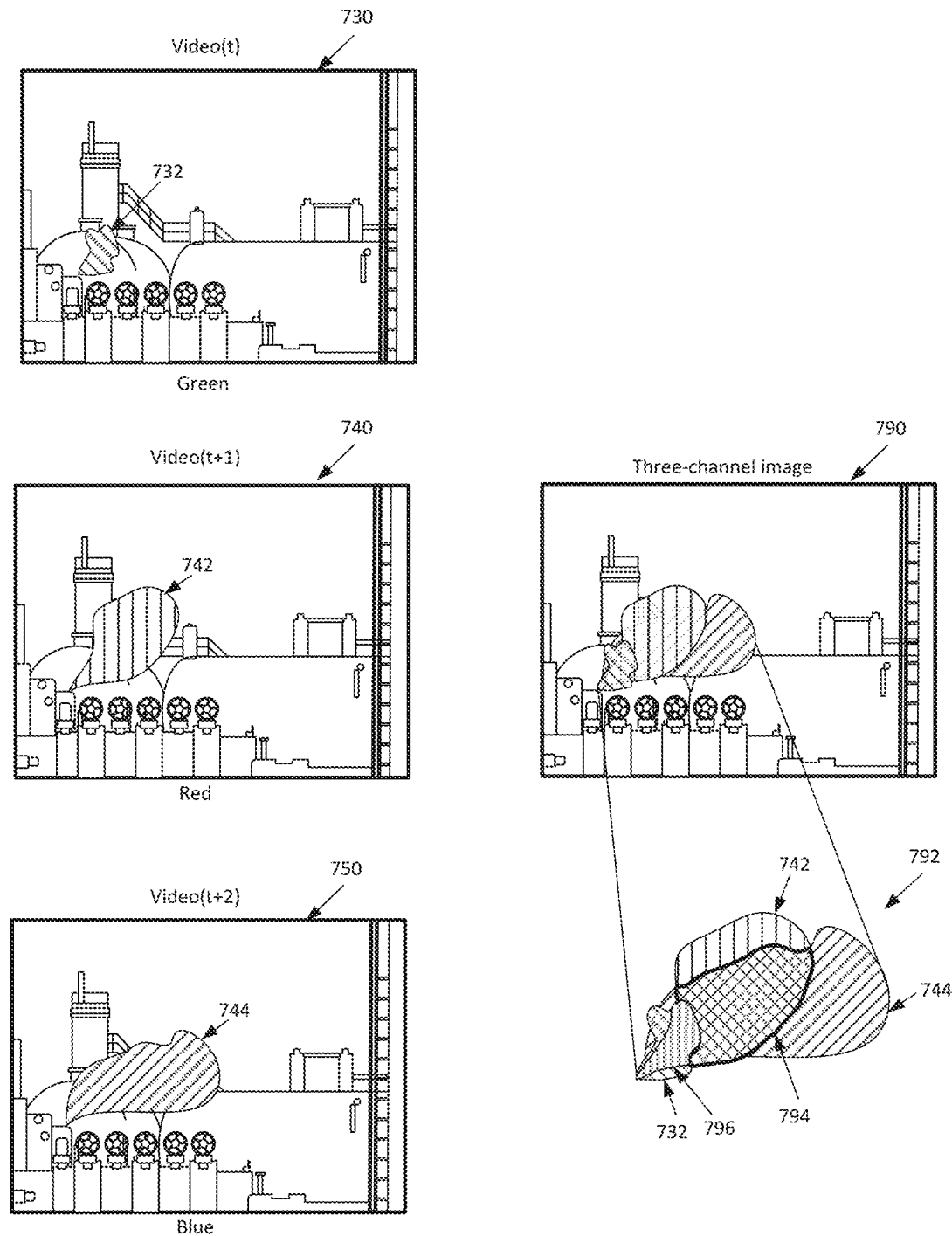
FIG. 7D depicts another example of stacking three frames into another three-channel image according to some embodiments.

FIG. 7D shows in further detail stacking of three frames, frames 730, 740, and 750, into a three-channel image according to some embodiments. Recall in this example that these frames are grayscale images, as is usually the case with IR imaging. The intensity or brightness of the pixels which make up each grayscale image is dependent on the intensity of the heat measured by the image capture device 104.

The intensity of the green color of frame 730 is dependent on the intensity of the pixels of the grayscale image captured at time t. Frame 730 includes area 732, which represents the gas emission at time t. The intensity of the green color in frame 730 may be dependent on the intensity of the pixels of the grayscale image captured at time t. Similarly, the intensity of the red color of frame 740 may be dependent on the intensity of the pixels of the grayscale image captured at time t+1. Frame 740 includes area 742, which represents a gas emission at time t+1. Likewise, the intensity of the blue color of frame 750 may be dependent on the intensity of the pixels of the grayscale image captured at time t+2. Frame 750 includes area 744 which represents the gas emission at time t+2.

Once the frame engine 206 combines (e.g., "stacks") frames 730, 740, and 750, the frame engine 206 may output a three-channel image 790. The three-channel image 780 includes a composite area 792, which includes area 732 represents the gas emission at time t. This area may be provided or outputted to a user interface in green. Composite area 792 also includes area 742, which represents the gas emission at time t+1. This area may be provided or outputted to the user interface in red. Composite area 792 further includes area 744, which represents the gas emission at time t+2. This area may be provided or outputted to the user interface in blue. A section 794 of the composite area 792 in which the red and blue colors from the interpretation of frames 740 and 750 with red and blue channels respectively overlap may be outputted to the user interface in magenta. Another section 796 of the composite area 792 in which all three colors, from the interpretation of frames 730, 740, and 750 with blue, red, and blue channels, respectively, may be outputted to the user interface in another color. In some embodiments, the different sections of the composite area 792 may be provided or outputted to the user interface in different colors, depending on the combination of the channels (in this example, green, red, and blue). In this example, a section of the composite area 792 in which the red and green color areas overlap may be provided in yellow. In various embodiments, the entire composite area 792 may be provided or outputted to the user interface in a single color. The color may be chosen based on properties of the aggregation of the gas emission over a period, for example, time t through t+2. Properties may include an aggregate size of the gas emission and an aggregate or average flow rate of the gas emission.

The three-channel images 780 and 790 may make up a set of three-channel frames to input to the AI engine 208 in the next step of the process of detecting gases.

In step 306, the set of three-channel frames generated by the frame engine 206 may be sent to the AI engine 208. The frame engine 206 may apply any number of models for segmentation mask creation. In various embodiments, the gas monitoring system 102 adds a branch for predicting segmentation masks on each region of interest (RoI) in parallel with the existing branch for classification and bounding box/non-rectangular, polygonal shape regression.

The frame engine 206 may apply a fully convolutional network (FCN) to each RoI of an image to predict a segmentation mask in a pixel to pixel manner. This process is different than Faster R-CNN which was not designed for pixel-to-pixel alignment between network inputs and outputs. For example, Faster R-CNN utilizes RoIPool as the core operation for attending to instances and performs coarse spatial quantization for feature extraction. To correct misalignment, the frame engine 206 applies a quantization-free layer that preserves spatial locations (i.e., RoIAlign discussed herein). This correction may significantly improve segmentation mask accuracy relative to Faster R-CNN.

As discussed herein, the frame engine 206 may decouple segmentation mask and class prediction. The frame engine 206 may predict a binary segmentation mask for each class independently without competition among classes and rely on the network's RoI classification to predict the category. FCNs do not perform as well because they perform per-pixel multi-class categorization which couples segmentation and classification.

The frame engine 206 may process an image using a region proposal network (RPN) to propose candidate object bounding boxes by sliding a network over a convolutional feature map outputted from a previous convolutional layer. In various embodiments, the frame engine 206 utilizes non-rectangular, polygonal shapes rather than bounding boxes to improve accuracy.

The frame engine 206 may extract features using RoIAlign from each candidate box (or candidate non-rectangular, polygonal shape) and performs classification and (bounding box or non-rectangular, polygonal shape) regression. In parallel to predicting the class and offset, the frame engine 206 may output a binary segmentation mask for each RoI (this is in contrast to systems where classification depends on segmentation mask predictions).

During training, the training engine may define a multi-task loss on each sampled RoI as we define a multi-task loss on each sampled RoI as $L=L_{cls}+L_{box}+L_{mask}$. The segmentation mask branch has a $Km^2$ dimensional output for each RoI. In some embodiments, the definition of the $L_{mask}$ may allow the training engine to generate a segmentation mask for every class without competition among classes (e.g., this decouples the segmentation mask and class prediction common when applying FCNs).

A segmentation mask may encode an input objects spatial layout. As a result, extracting the spatial structure of segmentation masks may be addressed by pixel-to-pixel correspondence provided by convolutions.

The segmentation masks may be non-rectangular, polygonal boxes. The frame engine 206 may then apply models to identify the segmentation masks within the image as a cloud representative of motion and/or a gas leak.

In step 308, the AI engine 208 may review the segmentation masks and classify any number of the segmentation masks. Any number of the segmentation masks may be classified as containing an image of a colored cloud (e.g., a representation of a leak). The classification engine 208 may utilize one or more models to classify any number of segmentation masks.

The gas leak detection engine 210 may determine if there is gas leak based on classification performed by the AI engine 208.

In step 310, the gas leak detection engine 210 may receive a request to determine a location and/or map each gas emission or gas leak detected by the AI engine 208 to a location and/or specific equipment in the gas equipment (e.g., gas station). The gas leak detection engine 210 may map infrastructure assets, such as pressure vessels, heat exchanges, storage tanks, and pump and compressors in the refinery facility to infrastructure assets captured by the various image capture devices.

Further details regarding the process to map infrastructure assets to images captured by one or more image capture devices are explained with reference to FIG. 4.

In step 312, the gas leak volume estimator engine 216 may receive a request (e.g., from the user interface) to estimate the volume and density of gas detected by the AI engine 208 (e.g., based on images with colored clouds depicting movement that is classified as a gas leak by the AI engine 208). The gas leak volume estimator engine 216 may estimate the volume of gas by estimating a planar area occupied by the gas detected by the AI engine 208 at time t and estimating the pixel value of the pixels that represent the gas leak in an image captured by the image capture device at time t. These values may be used to determine an estimate of the volume of the gas leak at time t. The pixel value corresponds to the intensity of heat measured by the image capture device 104.

Weather may play a factor in determining the density of gas detected by the AI engine 208. For example, the ambient temperature, wind speed, and wind direction may have an effect on the dispersal rate of the emitted gas and may affect the detected density of the emitted gas.

The client system 110 may retrieve or display an occurrence of a gas leak in real-time (e.g., video of the gas leak, one or more RGB images depicting the gas leak as a colored cloud in the image, and/or alerts of a gas leak). The client system 110 may retrieve or display the information in any number of ways. In one example, the client system 110 may utilize an application (e.g., an app) or browser to navigate to a local web page. The local web server may communicate with the webserver to retrieve the metrics of a gas leak (e.g., density, volume, duration of leak, when leak began, direction of gas from the leak) using an API configured to communicate with or through the API server to retrieve a video of the gas leak along with properties of the gas leak.

In some embodiments, the gas monitoring system 102 may provide a notification of a gas leak in real-time or substantially in real-time. In various embodiments, the notification may be in the form of an email, a pop-up screen on a mobile computing device, SMS message, or an automated phone call.

In various embodiments, the client system 110 may communicate with the gas monitoring system 102 over or using a webpage and web server. For example, the webserver may provide a webpage accessible to the client system 110. In some embodiments, the client system 110 may be required to register and/or log into the webserver, control system, or other device to access the webpage. Log information and or information retrieved from the datastores may be logged or otherwise tracked and stored in the gas leak datastore 220. The webpage may provide a notification of a gas leak which occurred during a period of time. In various embodiments, the client system 110 communicates with the webserver to access the webpage using a VPN or other encrypted communication methodology. In some embodiments, the webpage may include an image replay of the gas leak.

The webpage may also provide properties of the gas leak, such as geographic coordinates of the gas leak, equipment identification number of the origin of the gas leak, flow rate of the gas leak, and/or estimate the size of the gas leak cloud. In some embodiments, the webpage may provide this information along with a live feed such that a user of the client system 110 may be aware of the changing properties of the gas leak as it occurs.

The client system 110 may communicate with a web page or other interface that displays a video replay option to review stored video (e.g., in the gas leak datastore 220) used for determination of a gas leak. The interface may also display velocity, density, and/or volume estimates of gas from leaks over time. In some embodiments, the interface may display a date, location, and other properties of a gas leak that was detected by the gas monitoring system 102 at the date and location. In some embodiments, previous occurrences of gas leaks at the same geographic location may be displayed along with the video replay or stored video of a gas leak.

In some embodiments, the gas monitoring system 102 may include or be in communication with IR image capture devices and visual image capture devices. A visual image capture device and an IR image capture device may include the same or similar fields of view. In various embodiments, the frame engine 206 and/or the user interface 218 may combine the multi-channel image (e.g., the RGB "stacked" image) with a color image from the visual image capture device such that the resulting image includes the colored cloud form the RGB image against the color image from the visual capture device for an attractive view and additional details that may otherwise be hidden in the multi-channel image (e.g., such as equipment details). The visual image that is combined with the multi-channel image may, in some embodiments, be taken during the time of the component images of the multi-channel image (e.g., at t−2 which is a time of a captured IR image used in the multi-channel image). In this example, images from the visual capture device (e.g., a camera that takes images in the visual spectrum) may be received by the gas monitoring system 102 while the gas monitoring system 102 receives IR images from other image capture devices. The gas monitoring system 102 may use the IR images for the multi-channel image and combine the multi-channel image with a visual image taken at or near the same time of any of the images from the multi-channel image (or a past visual image) if a gas leak is detected or a user requests the combined image (e.g., the combined image being the multi-channel image with the visual image).

FIG. 4 is a flowchart 400 depicting a process of mapping infrastructure assets to images captured by image capture devices of the gas monitoring system according to some embodiments.

In step 402, one or more image capture devices 104 may be installed in various locations around a gas station. The locations of these image capture devices are chosen so that their field of view includes gas equipment such as pressure vessels, heat exchanges, storage tanks, pipes, and/or pumps and compressors.

In step 404, the input engine 202 may optionally receive and decode video from the image capture device 104. In some embodiments, the received video or image frames may require calibration, which may include adjusting the exposure rate, frame rate, and the like. An example of an image captured by the image capture device 104 is image 500 of FIG. 5.

Figure 9:
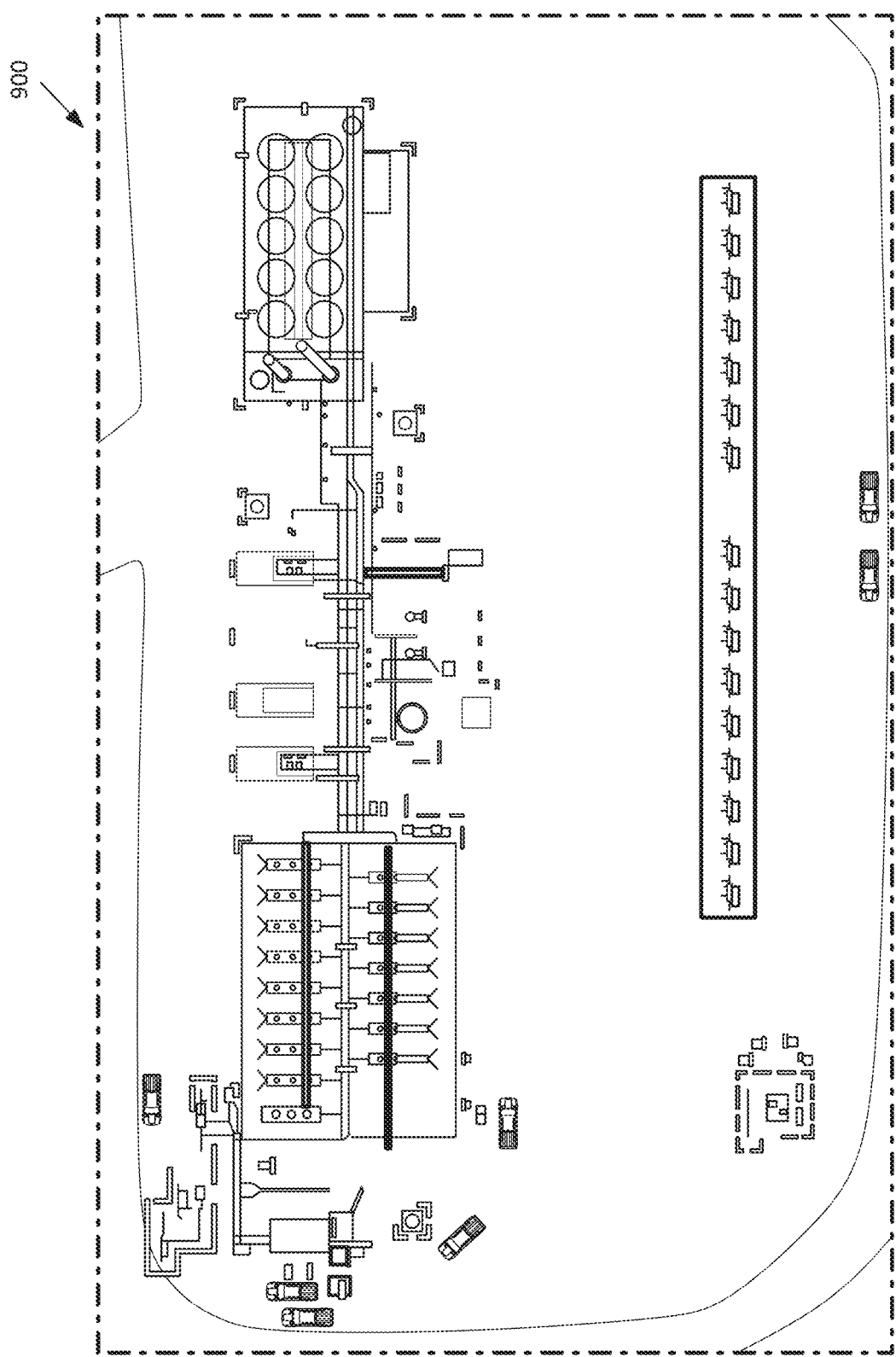
FIG. 9 depicts an example of an aerial image according to some embodiments.

In step 406, an aerial image of the refinery may be captured. FIG. 9 depicts an example aerial image 900, which may be useful in determining an overall view of the gas station. The aerial imagery may include coordinates of the area including land and equipment of the gas station that may be used by the gas leak location engine 212 to approximate gas leaks. As discussed herein, for example, the gas leak location engine 212 may receive the coordinates from satellite, drone, digital device associated with the aerial image 900. The gas leak location engine 212 may use equipment identifiers and/or coordinates to associate different parts in the field of views of the image capture devices. The gas leak location engine 212 may determine proximity of a cloud representing movement of a colored combined image (e.g., an RGB image) using pixels of areas, equipment or the like relative to pixels of the cloud.

In step 408, multiple points on an image captured by the image capture device 104, such as the example image 500 of FIG. 5, may be selected. For example, a number of points of the example image 500, including points 540, 542, 544, and 546, may be chosen.

In step 410, locations on the example aerial image 900 of FIG. 9 corresponding to the points 540, 542, 544, and 546 of FIG. 5 may be determined. For example, the gas leak location engine 212 may determine the cartesian coordinates of each of the points 540, 542, 544, and 546. For example, the cartesian coordinates of point 540, (x1, y1) of the example image 500 captured by a particular image capture device 104, the gas leak location engine 212 may receive an input on the user interface of an area of example aerial image 900 of FIG. 9 which corresponds to an area corresponding to the point 540.

In step 412, the gas leak location engine 212 may map infrastructure assets to images captured by each of the image capture devices 104.

FIG. 10 is a block diagram illustrating entities of an example machine able to read instructions from a machine-readable medium and execute those instructions in a processor to perform the machine processing tasks discussed herein, such as the engine operations discussed above. Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a data store 1016, a signal generation device 1018 (e.g., a speaker), an audio input device 1026 (e.g., a microphone) and a network interface device 1020, which also are configured to communicate via the bus 1008.

The data store 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network (not shown) via network interface 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 10. Alternatively, hardware or software engines may be stored elsewhere within a computing system.

As referenced herein, a computer or computing system includes hardware elements used for the operations described here regardless of specific reference in FIG. 10 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
   at least one processor; and
   memory, the memory containing instructions to control any number of the at least one processor to:
   receive, from a first infrared image capture device with a first field of view, three images including at least some gas equipment, the three images including a first image of the at least some gas equipment captured at a first time period, a second image of the at least some gas equipment captured at a second time period, and a third image of the at least some gas equipment captured at a third time period, the first time period being before the second time period and the third time period, the second time period being before the third time period, the three images capturing an infrared spectrum;
   interpret one of the three images in a red color channel of an RGB image where pixels are red-tonal in coloring;
   interpret an other of the three images in a green color channel of the RGB image where pixels are green-tonal in coloring;
   interpret a remaining of the three images in a blue color channel of the RGB image where pixels are blue-tonal in coloring; and
   provide the RGB image for display, the RGB image indicating movement in at least one of the three images over the second time period or third time period relative to the first time period as at least one color that is different from color of at least some of the gas equipment in the three images.

2. The system of claim 1, the instructions to control the any number of the at least one processor to further detect a change in the color of the RGB image and provide a notification regarding a possible gas leak based on an indication of the movement.

3. The system of claim 2, wherein the instructions to control the at least one processor to further detect the change in the color of the RGB image comprises the at least one processor to:
   generate feature maps from the RGB image by applying at least a first convolutional neural network;
   obtain a plurality of anchor shapes using a region proposal network by applying a first window across the feature maps;
   determine if each anchor shape of the plurality of anchor shapes contains an object to generate a plurality of regions of interest;
   extract feature maps from each region of interest;
   classify objects in each region of interest;
   predict segmentation masks on at least a subset of the plurality of regions of interest in a pixel-to-pixel manner;
   identify a cloud of gas within the objects based on classifications and the segmentation masks; and
   provide a notification of an indication of a gas leak based on an identification of the cloud of gas.

4. The system of claim 3, wherein each of the plurality of regions of interest being a non-rectangular, polygonal shape.

5. The system of claim 1, wherein interpret the one of the three images in the red color channel of the RGB image where pixels are red-tonal in coloring comprises interpreting intensity of pixels that make up the one of the three images is converted from gray monochrome to concentrations that are the red-tonal.

6. The system of claim 1, wherein the RGB image represents movement relative to the first image as blue-tonal pixels.

7. The system of claim 1, the instructions to control the any number of the at least one processor to further stabilize at least one of the three images from an effect of a shaking of the first image capture device.

8. The system of claim 7, wherein the instructions to control the any number of the at least one processor to further stabilize at least one of the three images from the effect of the shaking of the first image capture device comprises the instructions to control the any number of the at least one processor to apply a phase cross correlation to offset the second image so that a second view of the second image is substantially same as a first view of the first image.

9. The system of claim 1, wherein the gas equipment includes at least one of a gas pipe for transporting gas or a gas storage tank.

10. The system of claim 1, wherein the instructions to control the any number of the at least one processor to further:
    receive, from a first visual spectrum image capture device with a second field of view, a color image including the at least some gas equipment; and
    combine the color image with the RGB image, wherein provide the RGB image for display includes provide the combined color image with the RGB image to depict pixels showing movement in red, blue, or green against contents of the color image to assist in locating a position of the movement.

11. The system of claim 1, wherein the instructions to control the any number of the at least one processor to further identify a location of the movement relative to at least part of the at least some gas equipment by receiving identifiers relative to the at least part of the at least some gas equipment, associating at least one of the identifiers with a position of the movement, and providing the at least one of the identifiers as the location.

12. A non-transitive computer readable medium comprising instructions to a control at least one processor to perform a method, the method comprising:

receiving, from a first infrared image capture device with a first field of view, three images including at least some gas equipment, the three images including a first image of the at least some gas equipment captured at a first time period, a second image of the at least some gas equipment captured at a second time period, and a third image of the at least some gas equipment captured at a third time period, the first time period being before the second time period and the third time period, the second time period being before the third time period, the three images capturing an infrared spectrum;

interpreting one of the three images in a red color channel of an RGB image where pixels are red-tonal in coloring;

interpreting an other of the three images in a green color channel of the RGB image where pixels are green-tonal in coloring;

interpreting a remaining of the three images in a blue color channel of the RGB image where pixels are blue-tonal in coloring; and providing the RGB image for display, the RGB image indicating movement in at least one of the three images over the second time period or third time period relative to the first time period as at least one color that is different from color of at least some of the gas equipment in the three images.

13. The non-transitive computer readable medium of claim 12, the method further comprising detecting a change in the color of the RGB image and providing a notification regarding a possible gas leak based on an indication of the movement.

14. The non-transitive computer readable medium of claim 13, wherein detecting the change in the color of the RGB image comprises:

generating feature maps from the RGB image by applying at least a first convolutional neural network;

obtaining a plurality of anchor shapes using a region proposal network by applying a first window across the feature maps;

determining if each anchor shape of the plurality of anchor shapes contains an object to generate a plurality of regions of interest;

extracting feature maps from each region of interest;

classifying objects in each region of interest;

predicting segmentation masks on at least a subset of the plurality of regions of interest in a pixel-to-pixel manner;

identifying a cloud of gas within the objects based on classifications and the segmentation masks; and providing a notification of an indication of a gas leak based on an identification of the cloud of gas.

15. The non-transitive computer readable medium of claim 14, wherein each of the plurality of regions of interest being a non-rectangular, polygonal shape.

16. The non-transitive computer readable medium of claim 12, wherein interpreting the one of the three images in the red color channel of the RGB image where pixels are red-tonal in coloring comprises applying an intensity of pixels that make up the one of the three images is converted from gray monochrome to concentrations that are the red-tonal.

17. The non-transitive computer readable medium of claim 12, wherein the RGB image represents movement relative to the first image as blue-tonal pixels.

18. The non-transitive computer readable medium of claim 12, the method further comprising stabilizing at least one of the three images from an effect of a shaking of the first image capture device.

19. The non-transitive computer readable medium of claim 18, wherein the stabilizing at least one of the three images from the effect of the shaking of the first image capture device comprises applying a phase cross correlation to offset the second image so that a second view of the second image is substantially same as a first view of the first image.

20. The non-transitive computer readable medium of claim 12, wherein the gas equipment includes at least one of a gas pipe for transporting gas or a gas storage tank.

21. The non-transitive computer readable medium of claim 12, the method further comprising:

receiving, from a first visual spectrum image capture device with a second field of view, a color image including the at least some gas equipment; and combining the color image with the RGB image, wherein provide the RGB image for display includes provide the combined color image with the RGB image to depict pixels showing movement in red, blue, or green against contents of the color image to assist in locating a position of the movement.

22. The non-transitive computer readable medium of claim 12, the method further comprising identifying a location of the movement relative to at least part of the at least some gas equipment by receiving identifiers relative to the at least part of the at least some gas equipment, associating at least one of the identifiers with a position of the movement, and providing the at least one of the identifiers as the location.

23. A method comprising:

receiving, from a first infrared image capture device with a first field of view, three images including at least some gas equipment, the three images including a first image of the at least some gas equipment captured at a first time period, a second image of the at least some gas equipment captured at a second time period, and a third image of the at least some gas equipment captured at a third time period, the first time period being before the second time period and the third time period, the second time period being before the third time period, the three images capturing an infrared spectrum;

interpreting one of the three images in a red color channel of an RGB image where pixels are red-tonal in coloring;

interpreting an other of the three images in a green color channel of the RGB image where pixels are green-tonal in coloring;

interpreting a remaining of the three images in a blue color channel of the RGB image where pixels are blue-tonal in coloring; and providing the RGB image for display, the RGB image indicating movement in at least one of the three images over the second time period or third time period relative to the first time period as at least one color that is different from color of at least some of the gas equipment in the three images.

* * * * *